(12) United States Patent
Yokota et al.

(10) Patent No.: US 11,039,120 B2
(45) Date of Patent: Jun. 15, 2021

(54) IMAGING APPARATUS

(71) Applicants: Soichiro Yokota, Kanagawa (JP); Hirokazu Takenaka, Kanagawa (JP); Tamon Sadasue, Kanagawa (JP)

(72) Inventors: Soichiro Yokota, Kanagawa (JP); Hirokazu Takenaka, Kanagawa (JP); Tamon Sadasue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/482,162

(22) PCT Filed: Jan. 31, 2018

(86) PCT No.: PCT/JP2018/003312
§ 371 (c)(1),
(2) Date: Jul. 30, 2019

(87) PCT Pub. No.: WO2018/143311
PCT Pub. Date: Aug. 9, 2018

(65) Prior Publication Data
US 2019/0394447 A1    Dec. 26, 2019

(30) Foreign Application Priority Data

Jan. 31, 2017  (JP) .............................. JP2017-016318
Jan. 15, 2018  (JP) .............................. JP2018-004161
Jan. 24, 2018  (JP) .............................. JP2018-010007

(51) Int. Cl.
*H04N 13/243*    (2018.01)
*H04N 13/282*    (2018.01)
(Continued)

(52) U.S. Cl.
CPC ........... *H04N 13/243* (2018.05); *G02B 30/34* (2020.01); *H04N 5/2258* (2013.01); *H04N 13/282* (2018.05)

(58) Field of Classification Search
CPC ........ G02B 13/06; G02B 30/34; G03B 37/04; H04N 13/243; H04N 13/282; H04N 5/2254; H04N 5/2258; H04N 5/23238
See application file for complete search history.

(56) References Cited

U.S. PATENT DOCUMENTS 9,521,321 B1 *  12/2016  Kozko ................. H04N 5/2254
10,430,994 B1 *  10/2019  Baker ..................... G06T 7/593
(Continued)

FOREIGN PATENT DOCUMENTS

CN        102113089 A       6/2011
JP        2005-063012       3/2005
(Continued)

OTHER PUBLICATIONS

Frederik Zilly, et al., "Generation of multi-view video plus depth content using mixed narrow and wide baseline setup," 3DTV-Conference: The True Vision—Capture, Transmission and Display of 3D Video (3DTV-CON), 2012, IEEE, Oct. 15, 2012, pp. 1-4.
(Continued)

*Primary Examiner* — Francis Geroleo
(74) *Attorney, Agent, or Firm* — Oblon, McClelland, Maier & Neustadt, L.L.P.

(57) ABSTRACT

An imaging apparatus includes a plurality of imaging bodies and an imaging control unit. Each of the imaging bodies includes a first optical element capable of imaging a range including a hemisphere that is centered at an optical axis and oriented in a first direction of the optical axis, and a second optical element capable of imaging a range including a hemisphere that is centered at the optical axis and oriented in a second direction opposite to the first direction. The imaging bodies are arrayed in a direction perpendicular to the optical axis. The imaging control unit causes the plurality of imaging bodies to perform imaging in a synchronous
(Continued)

manner, and acquires a captured image from each of the imaging bodies.

15 Claims, 28 Drawing Sheets

(51) Int. Cl.
  *G02B 30/34* (2020.01)
  *H04N 5/225* (2006.01)

(56) References Cited

U.S. PATENT DOCUMENTS

| | | | |
|---|---|---|---|
| 10,523,923 B2* | 12/2019 | Kashyap | H04N 13/296 |
| 2007/0147827 A1* | 6/2007 | Sheynman | G03B 29/00 396/325 |
| 2013/0235149 A1* | 9/2013 | Tanaka | H04N 5/23238 348/36 |
| 2013/0242040 A1* | 9/2013 | Masuda | H04N 5/2252 348/36 |
| 2016/0006907 A1 | 1/2016 | Masuda et al. | |
| 2016/0073024 A1 | 3/2016 | Yamamoto | |
| 2016/0073095 A1 | 3/2016 | Ogura | |
| 2016/0301912 A1 | 10/2016 | Saitoh et al. | |
| 2016/0337584 A1 | 11/2016 | Masuda et al. | |
| 2017/0078653 A1* | 3/2017 | Bi | B60R 1/00 |
| 2017/0098132 A1 | 4/2017 | Yokota et al. | |
| 2017/0177955 A1 | 6/2017 | Yokota et al. | |
| 2017/0289448 A1 | 10/2017 | Song | |
| 2017/0310895 A1 | 10/2017 | Masuda et al. | |
| 2018/0213152 A1 | 7/2018 | Masuda et al. | |
| 2019/0058829 A1 | 2/2019 | Song | |

FOREIGN PATENT DOCUMENTS

| | | |
|---|---|---|
| JP | 2005-063013 | 3/2005 |
| JP | 5011528 | 6/2012 |
| JP | 2013-214952 | 10/2013 |
| JP | 2013-218278 | 10/2013 |
| JP | 5783314 | 7/2015 |
| JP | 5839135 | 11/2015 |
| JP | 2016-149734 | 8/2016 |
| KR | 10-1675567 B1 | 11/2016 |
| WO | WO 2015/174547 A1 | 11/2015 |

OTHER PUBLICATIONS

International Search Report and Written Opinion dated May 3, 2018 in PCT/JP2018/003312 filed on Jan. 31, 2018.

Combined Chinese Office Action and Search Report dated Jul. 1, 2020 in Patent Application No. 201880009062.5 (with English language translation), 14 pages.

* cited by examiner

[Fig. 1]
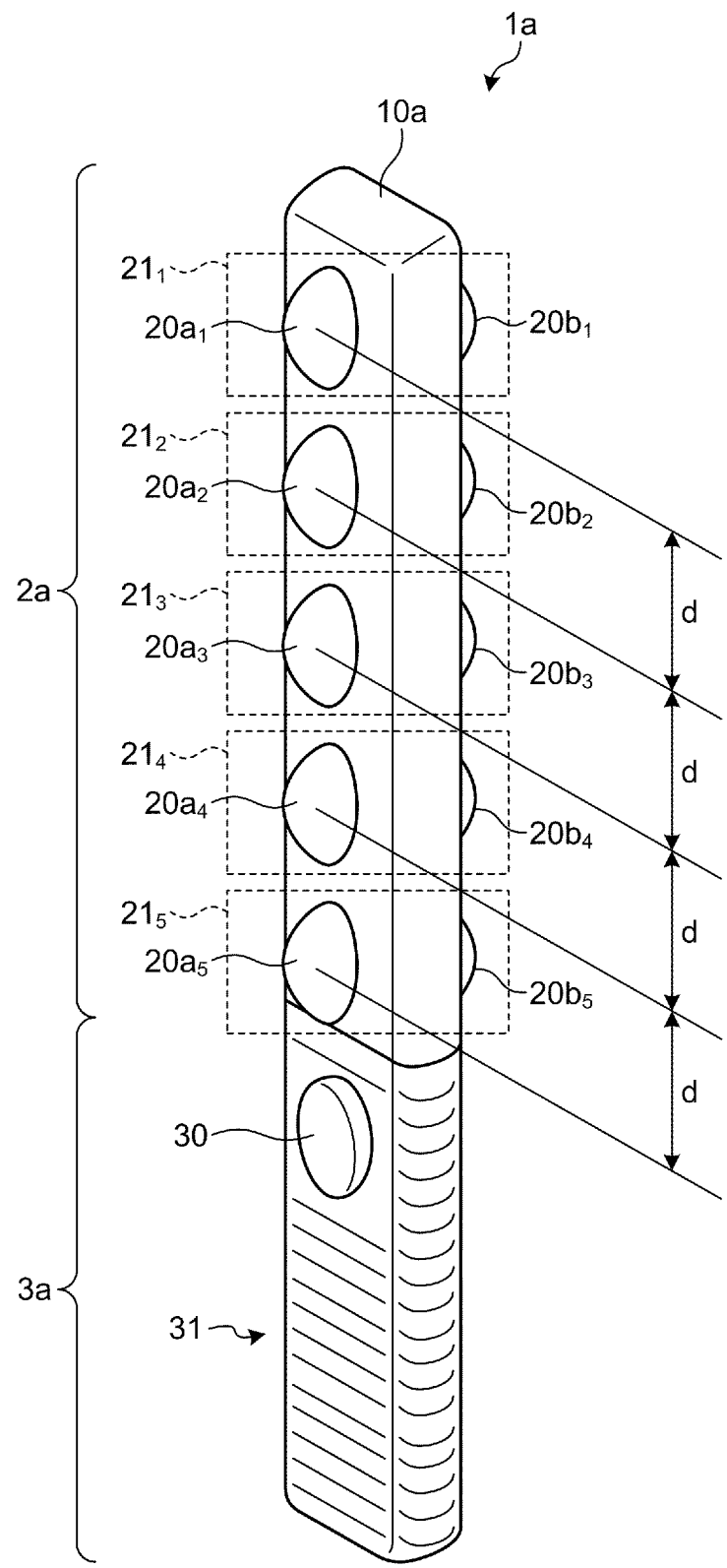

[Fig. 2]
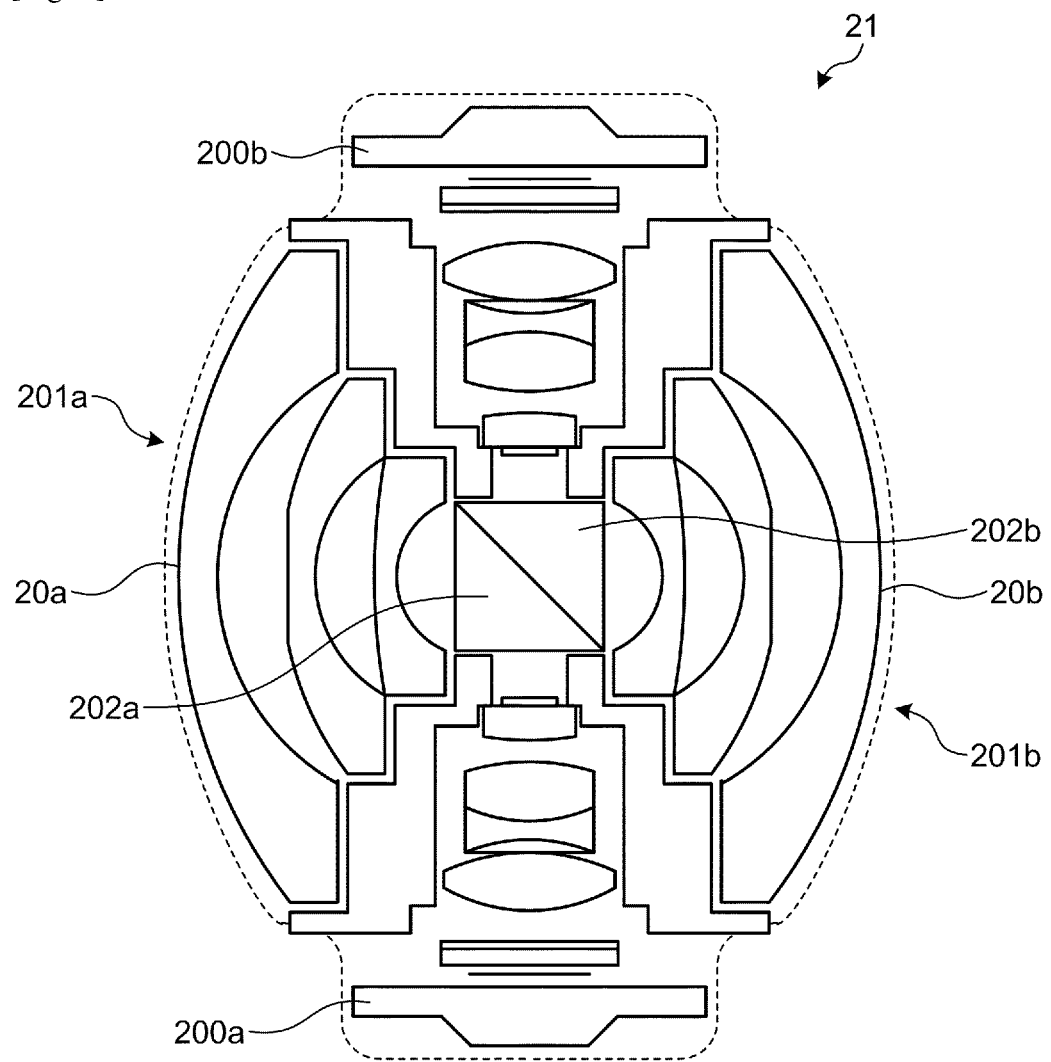

[Fig. 3]
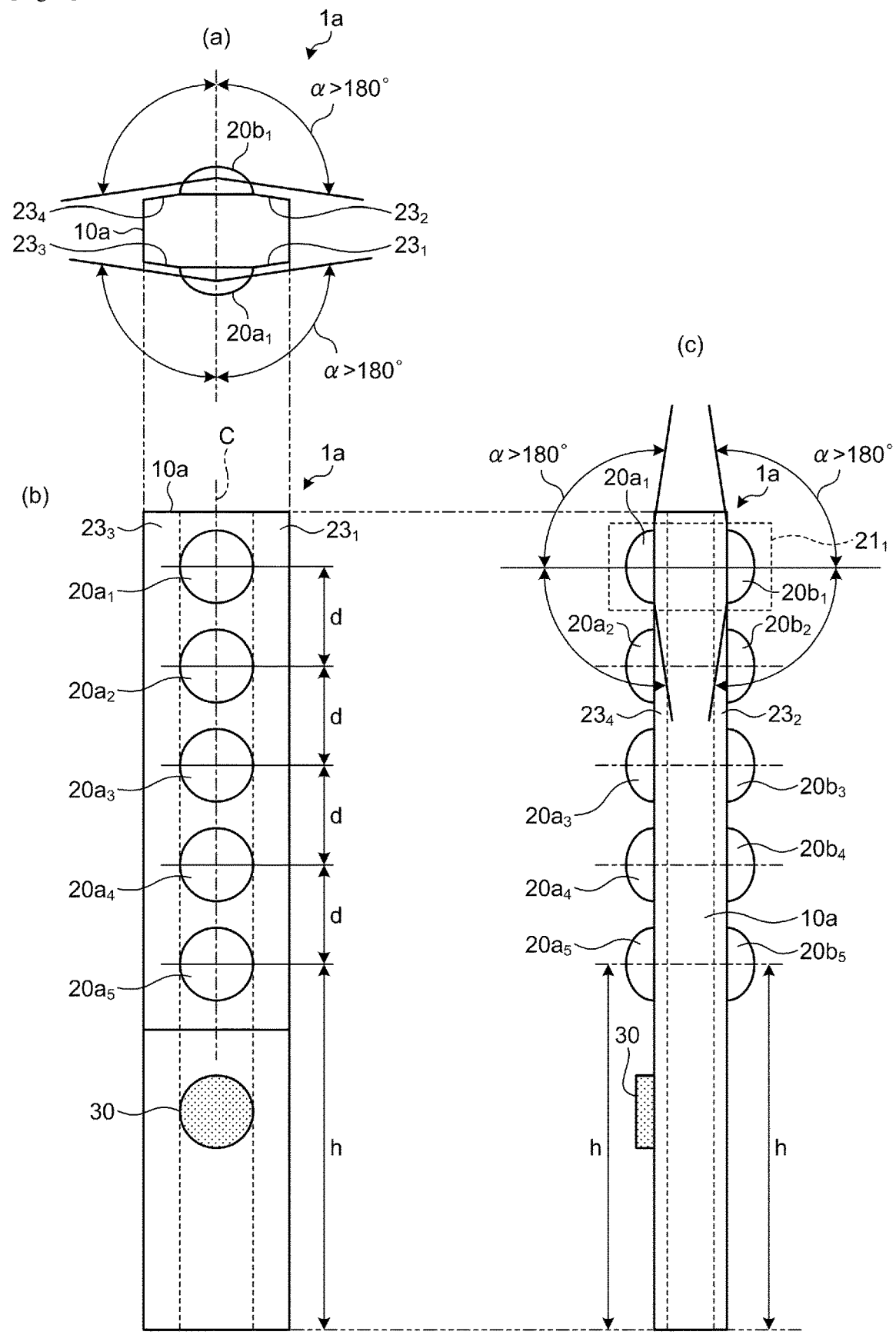

[Fig. 4]
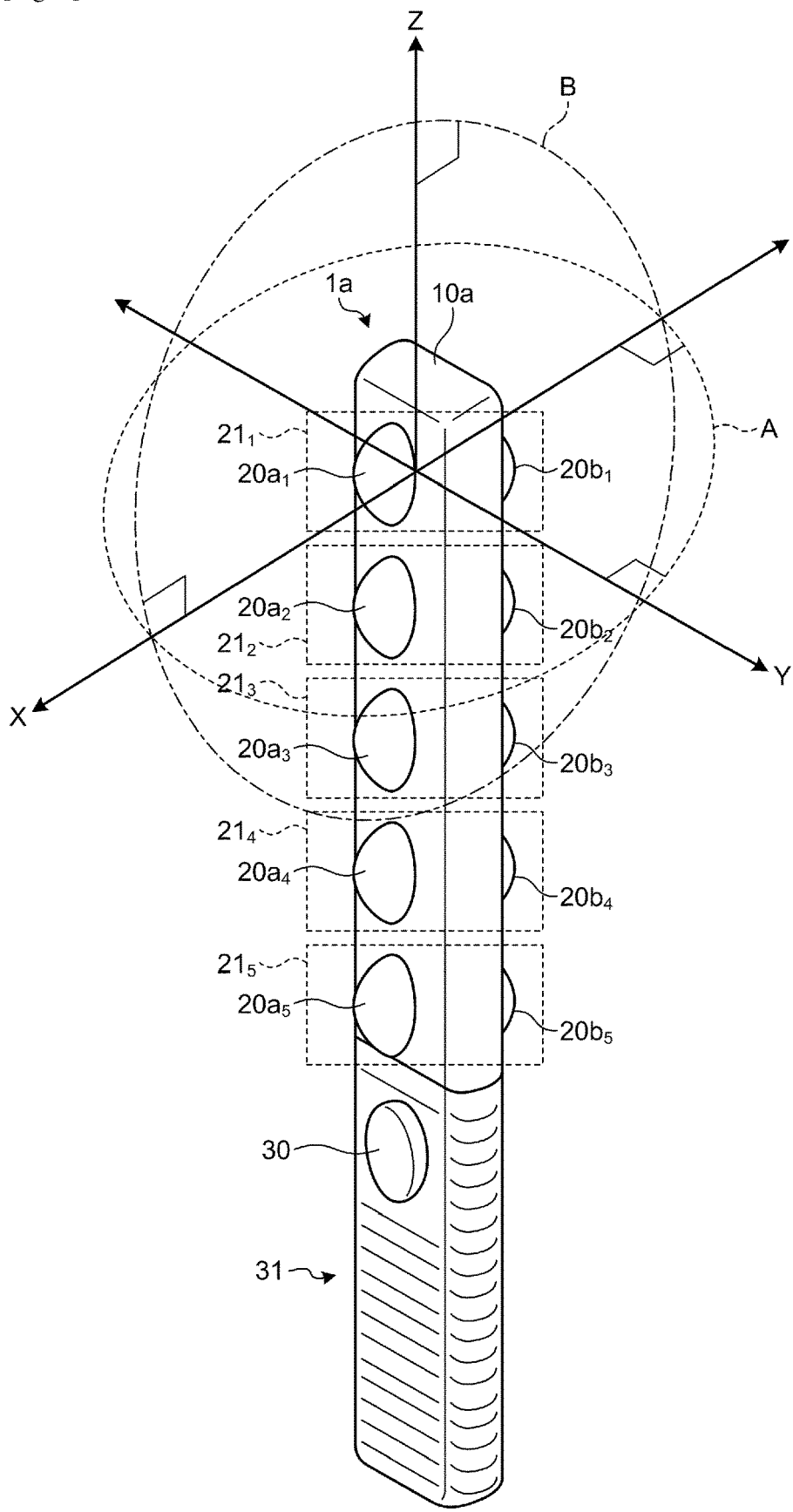

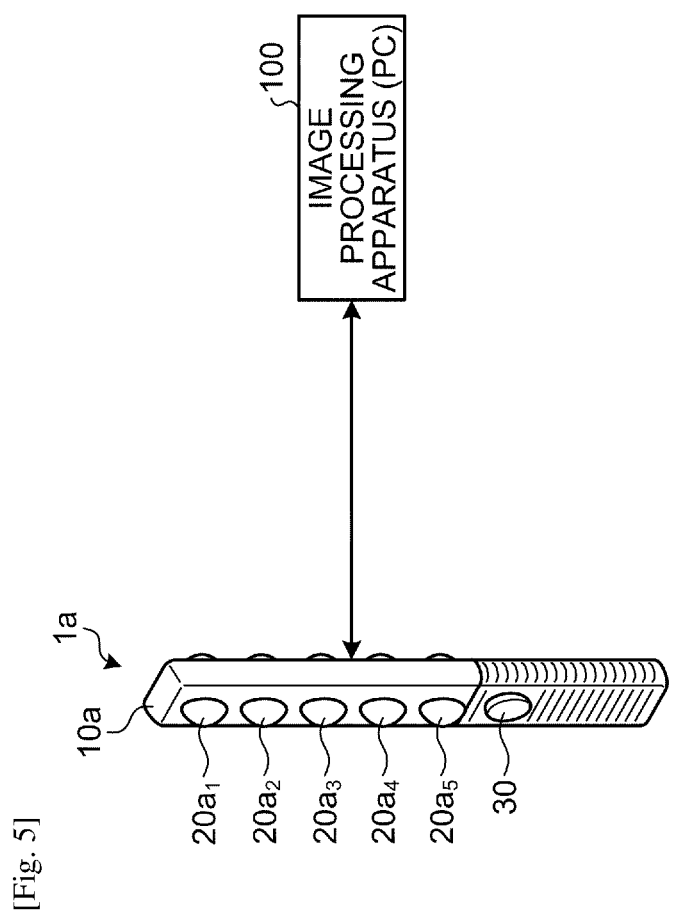
[Fig. 5]

[Fig. 6]
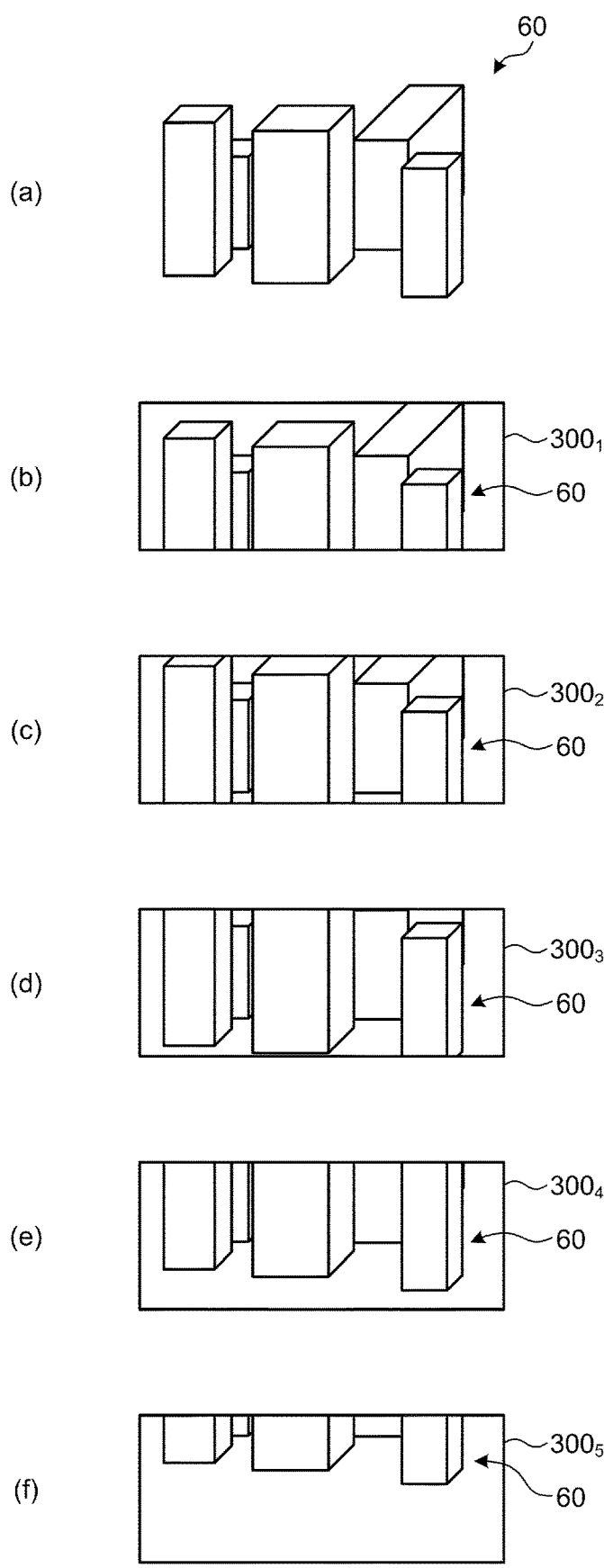

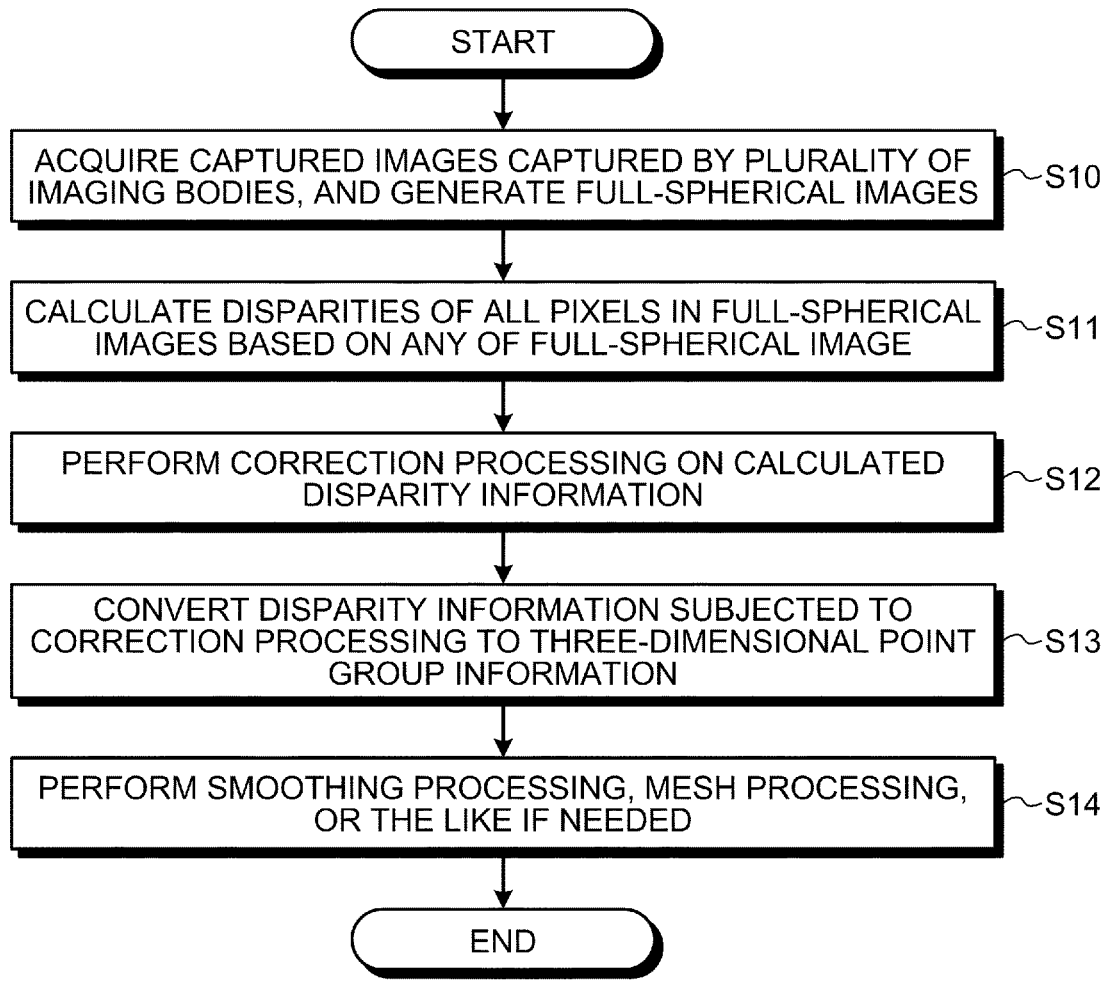
[Fig. 7]

[Fig. 8]
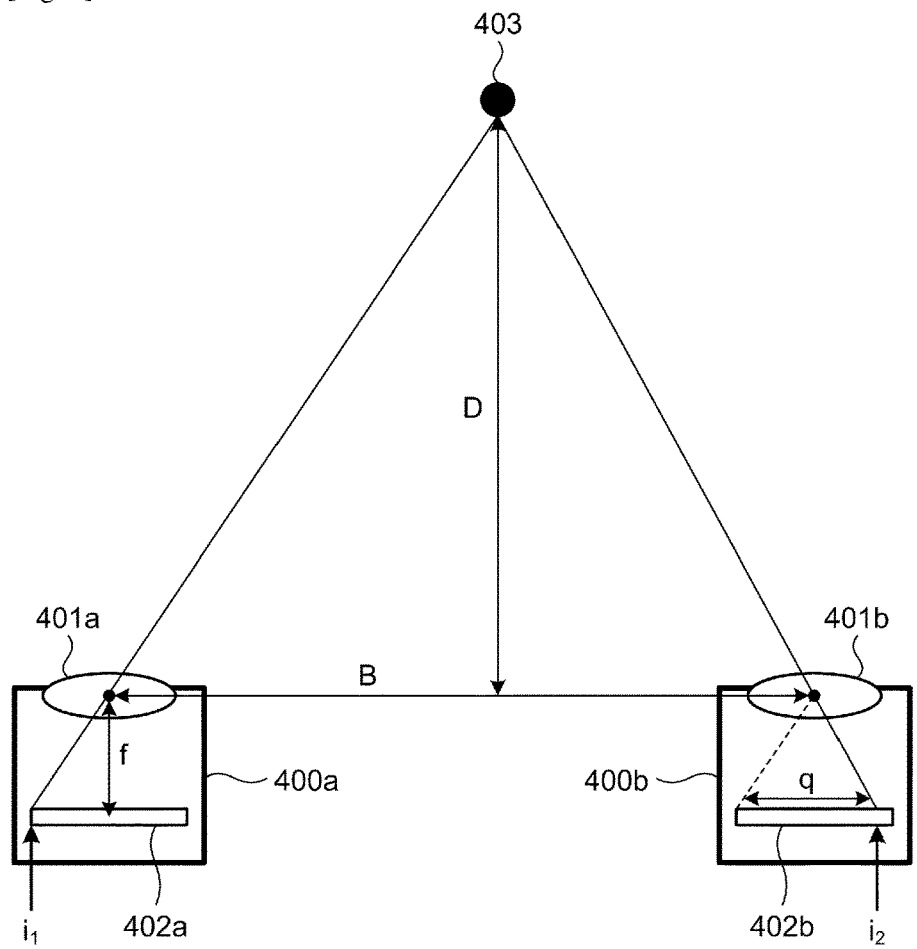
[Fig. 9]
(a)                                                                  (b)
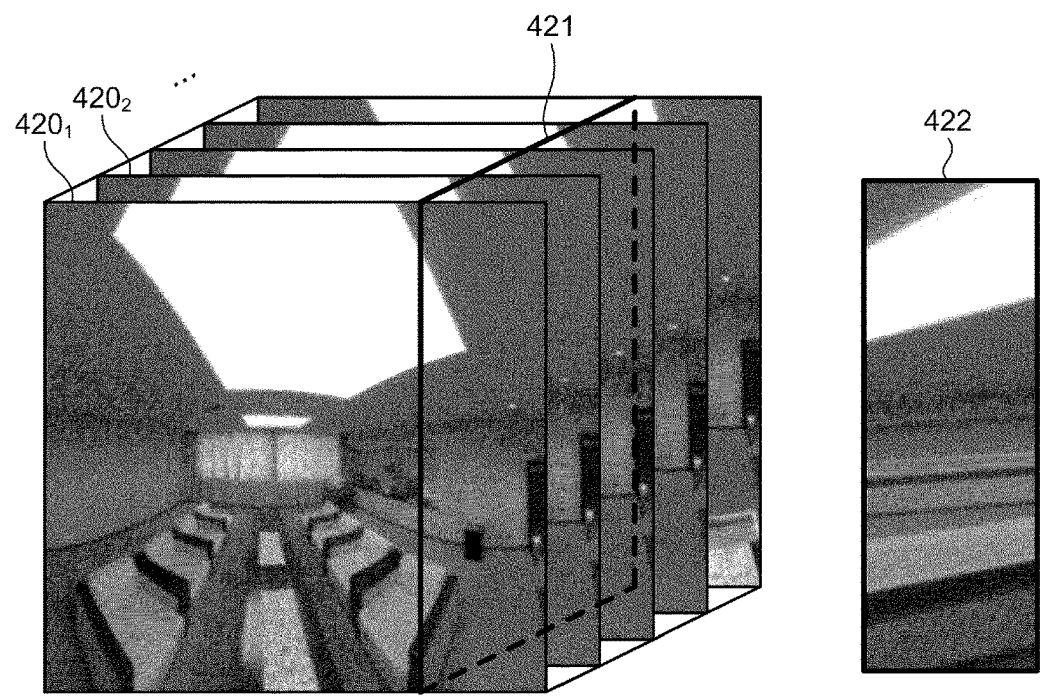

[Fig. 10]
(a)
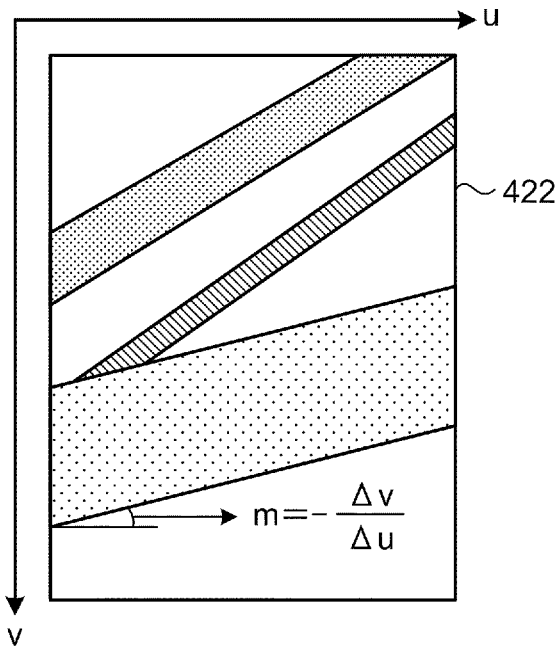
(b)
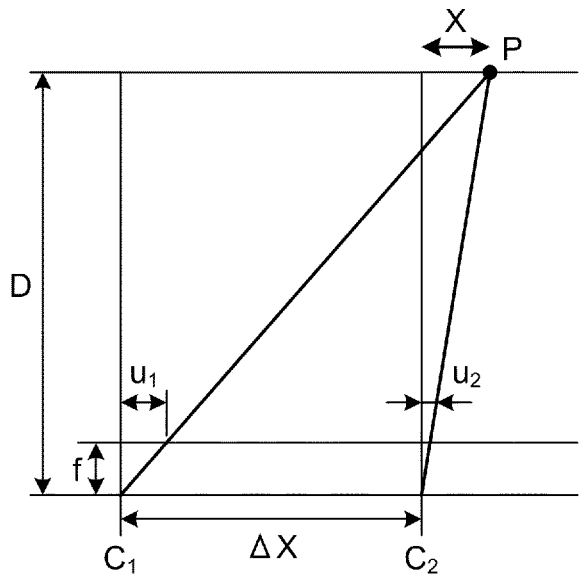
[Fig. 11]
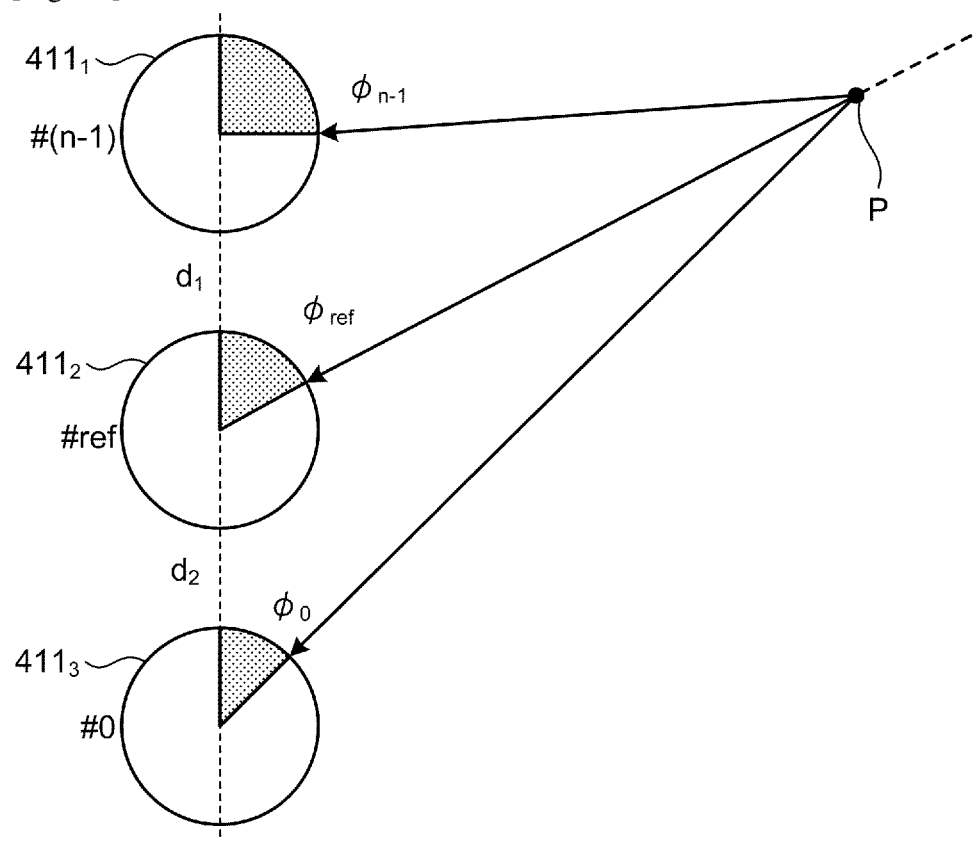

[Fig. 12]
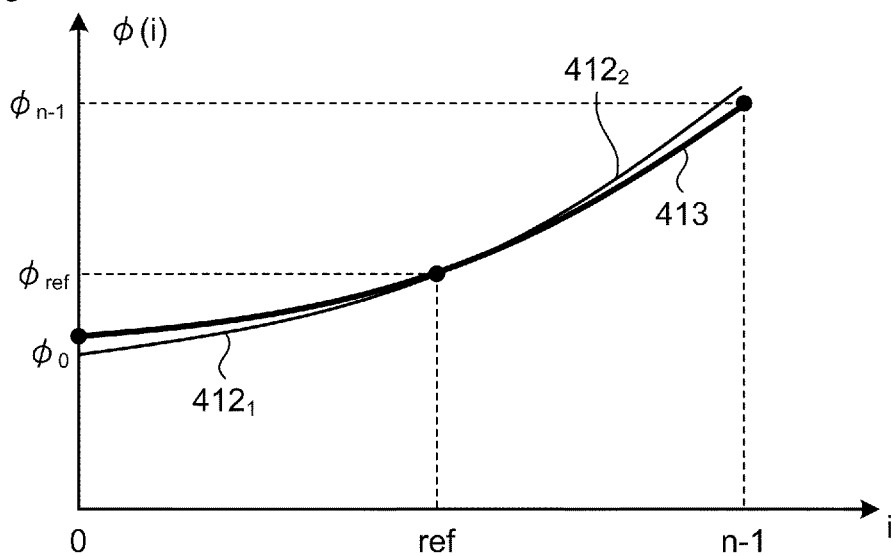
[Fig. 13]
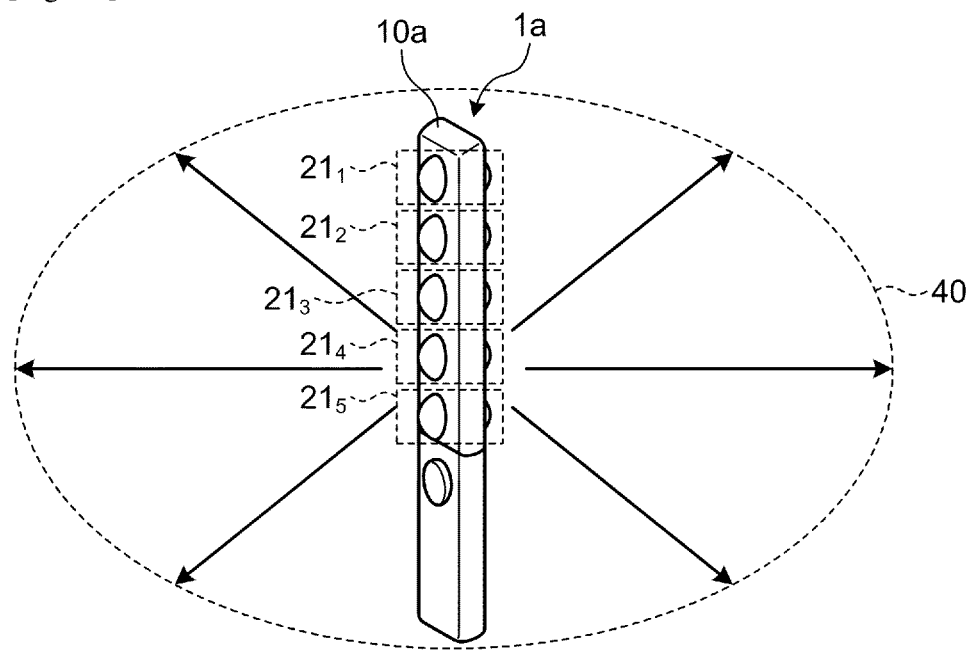

[Fig. 14]
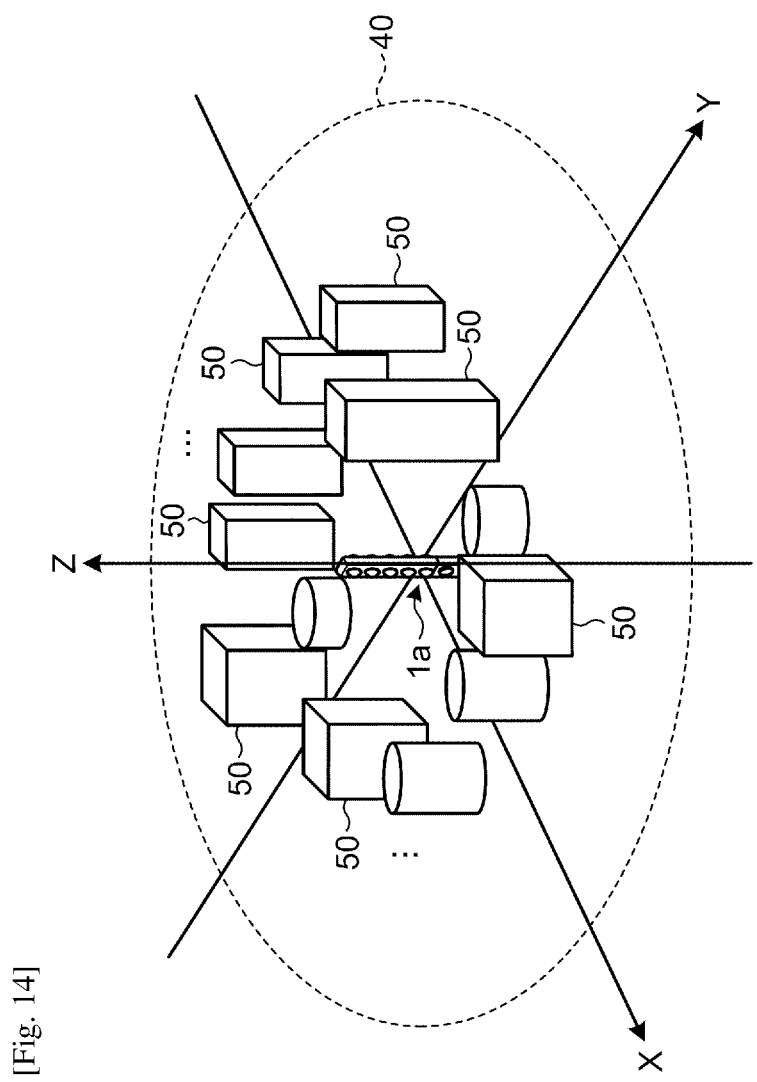

[Fig. 15-1]
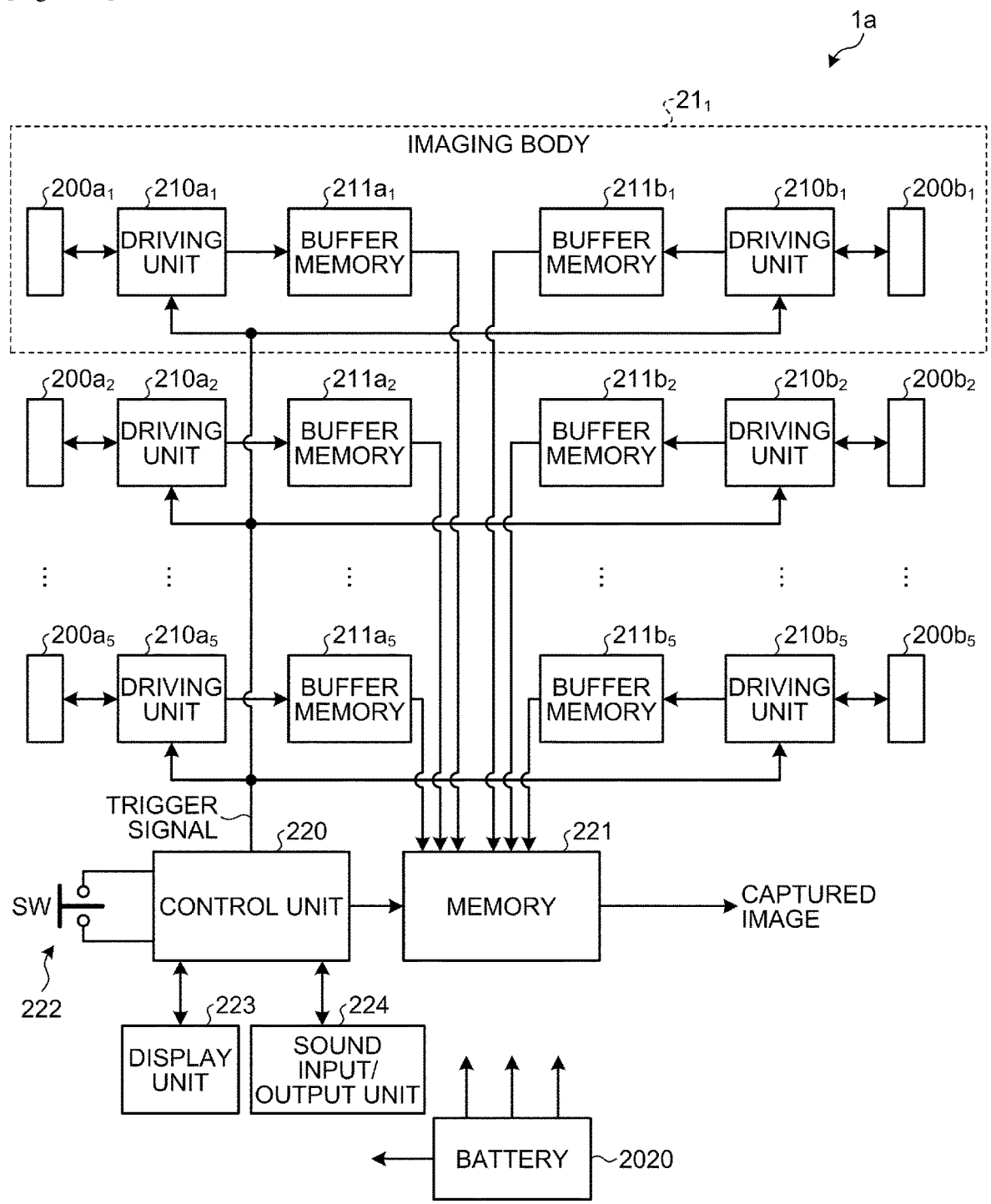

[Fig. 15-2]
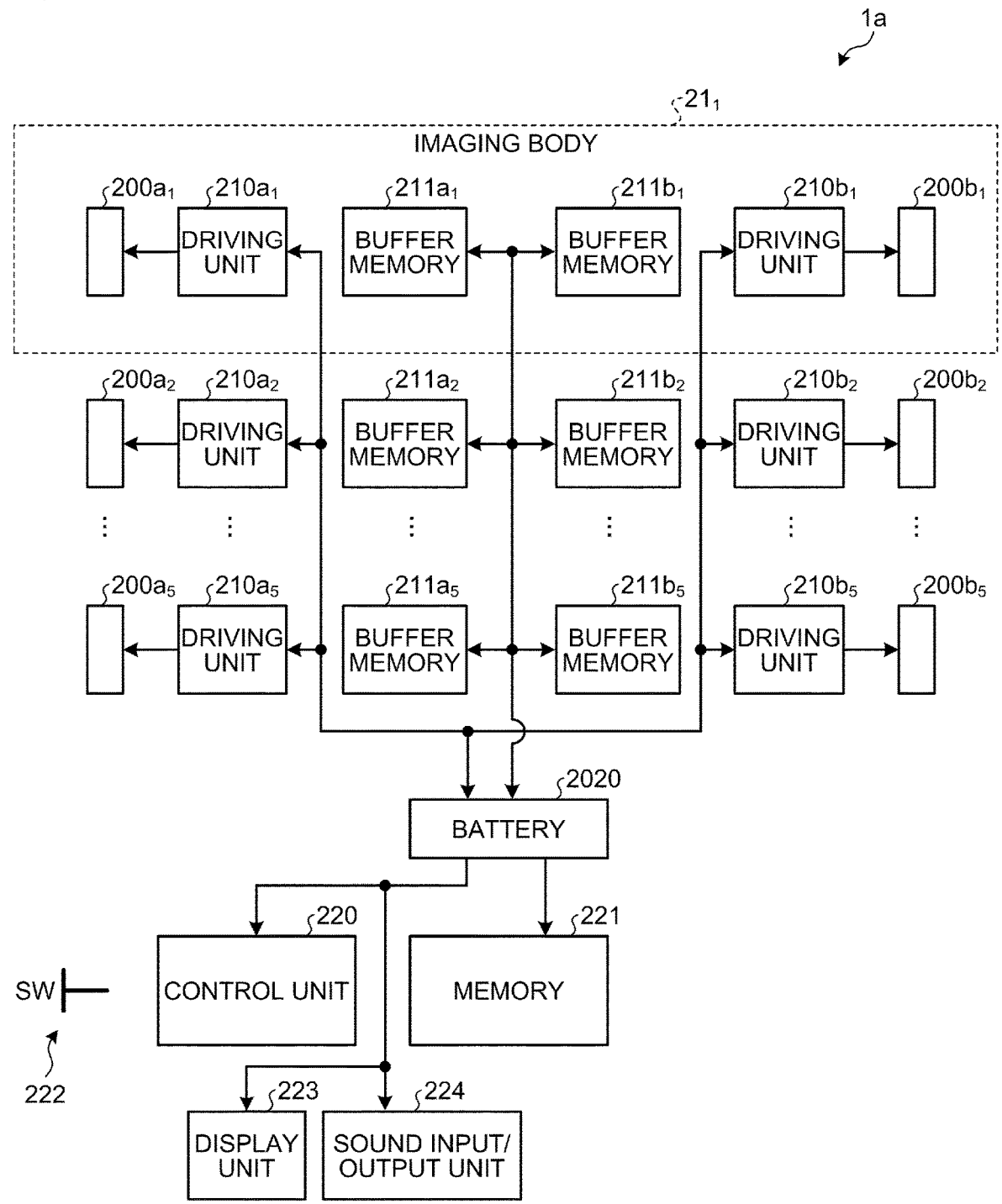

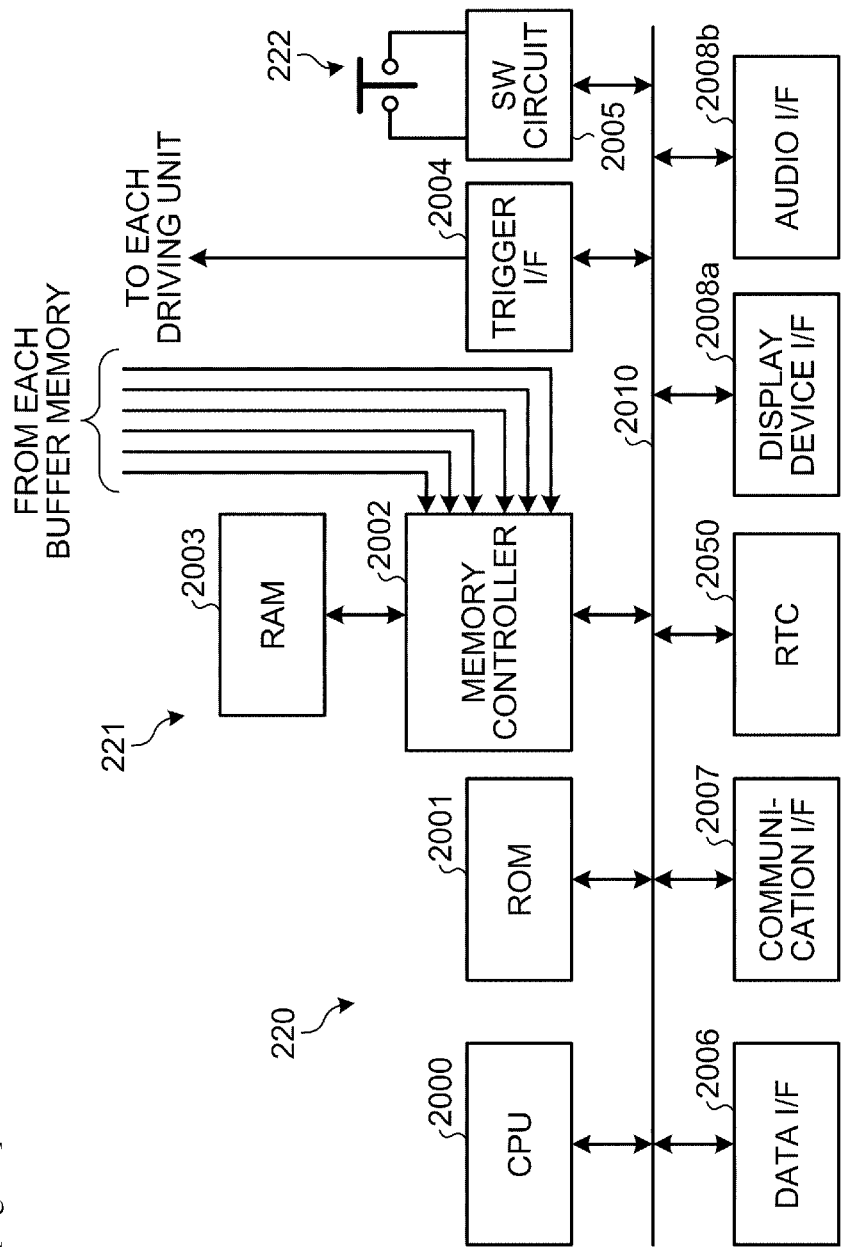

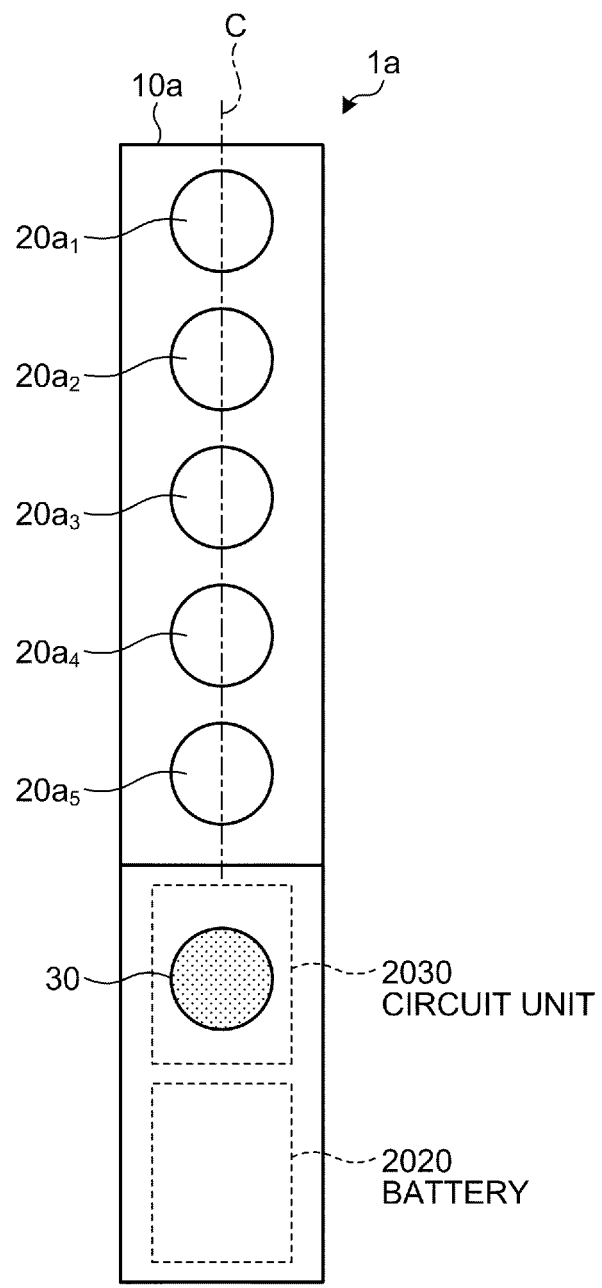
[Fig. 17]

[Fig. 18]
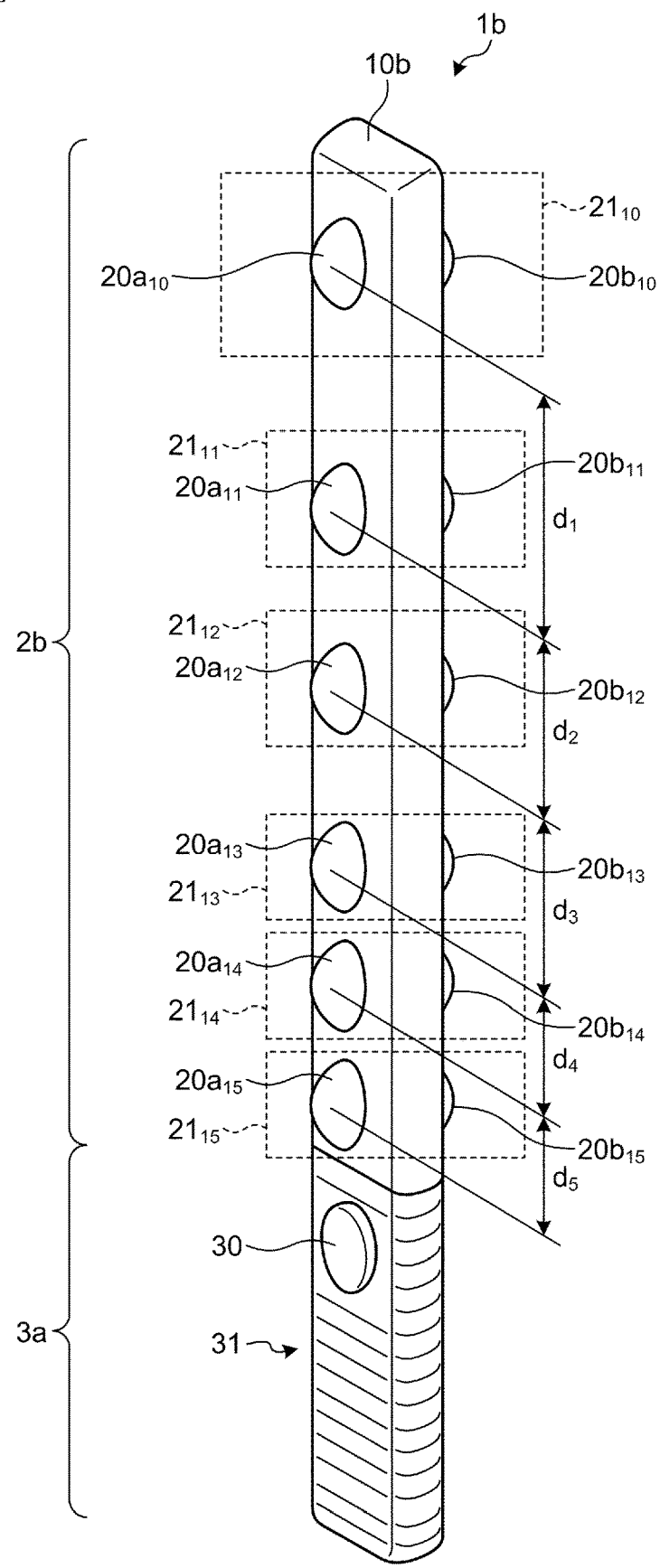

[Fig. 19]
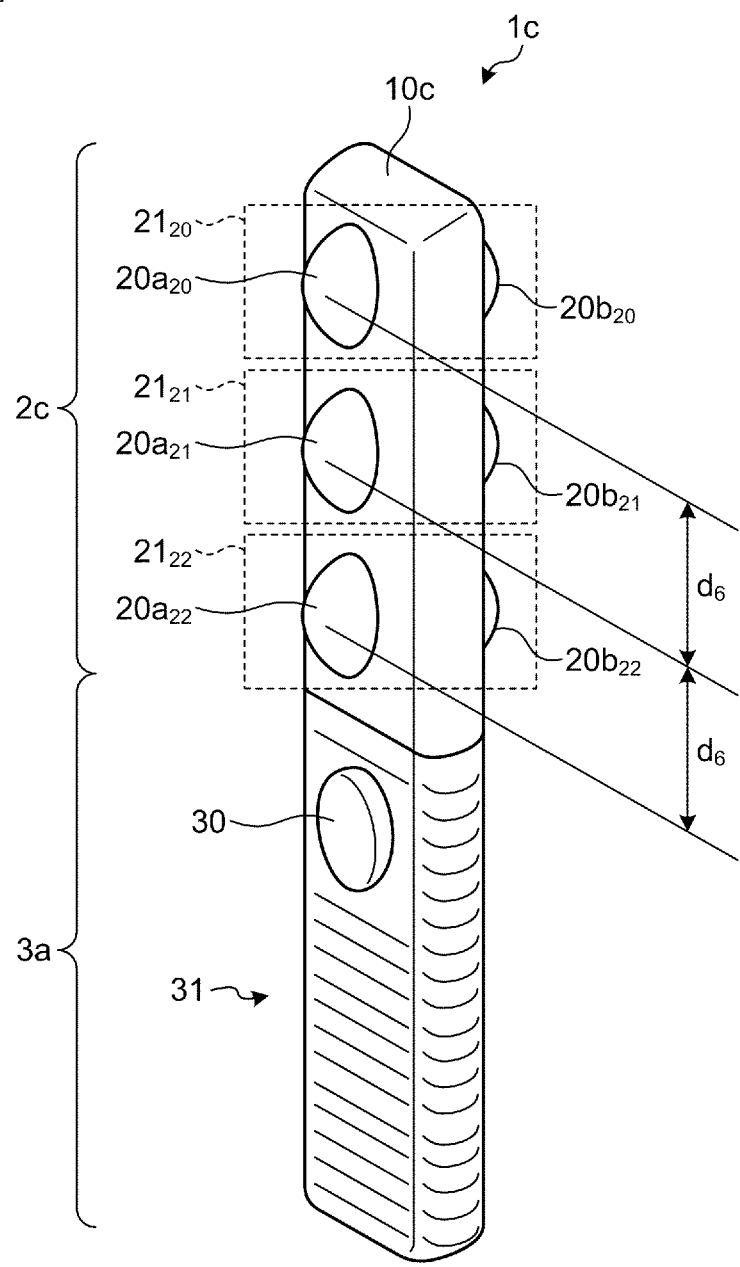

[Fig. 20]
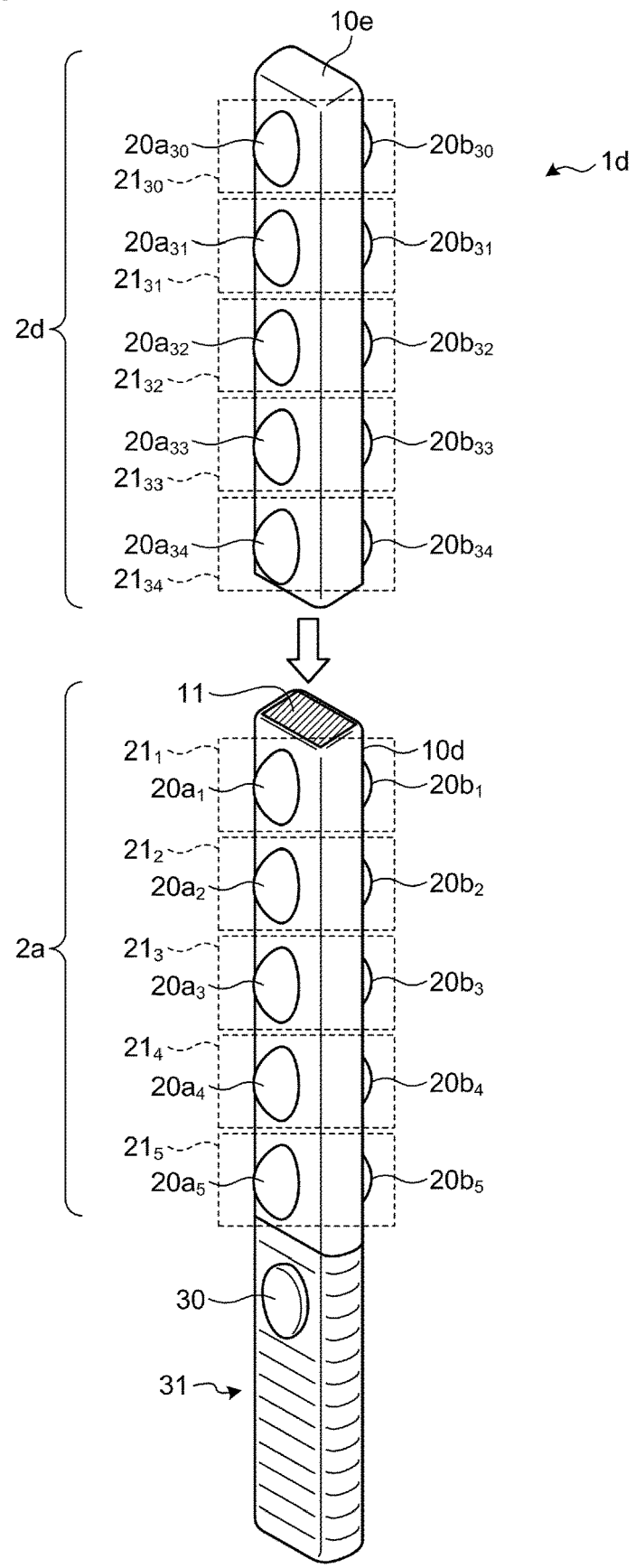

[Fig. 21]
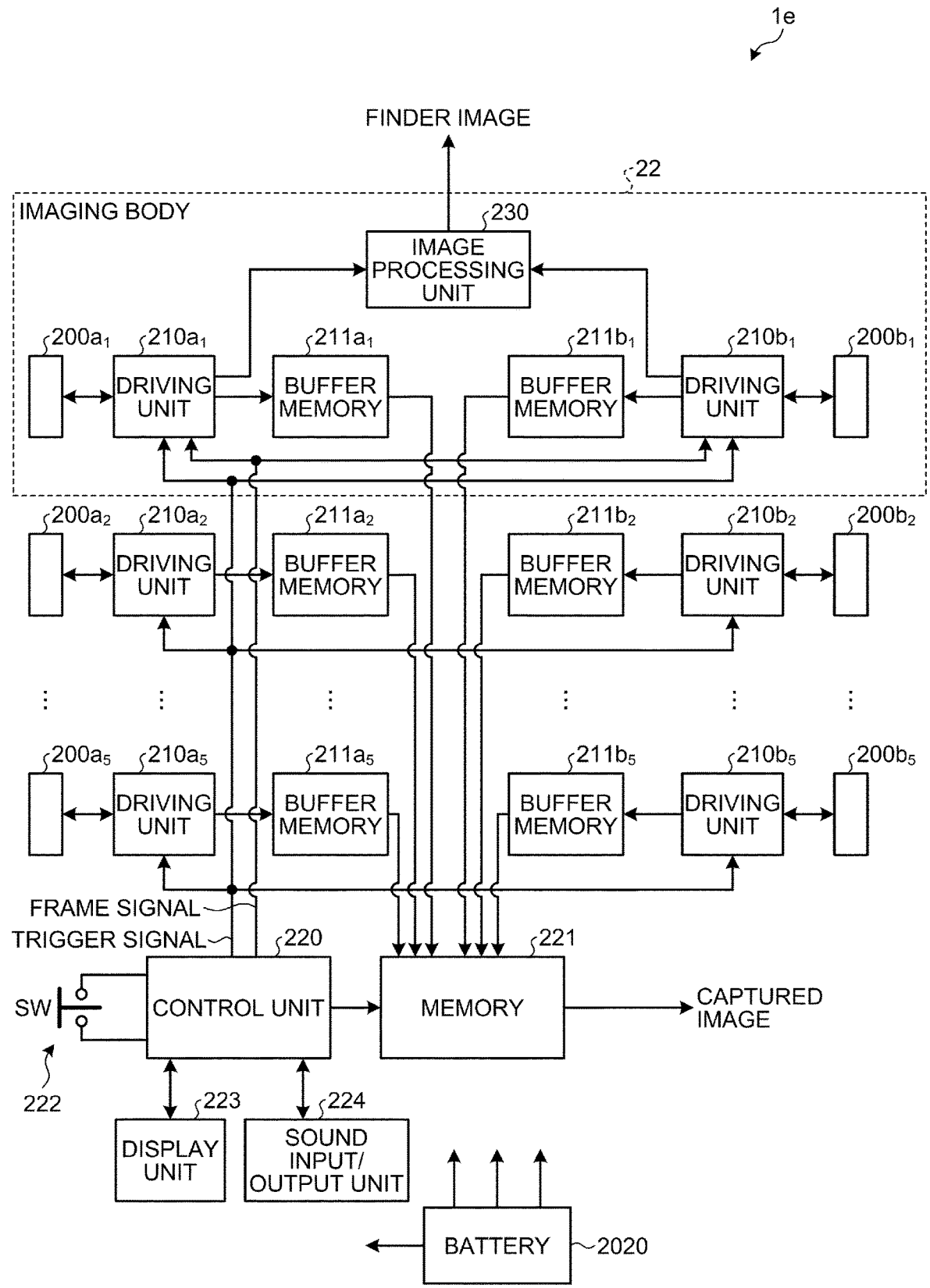

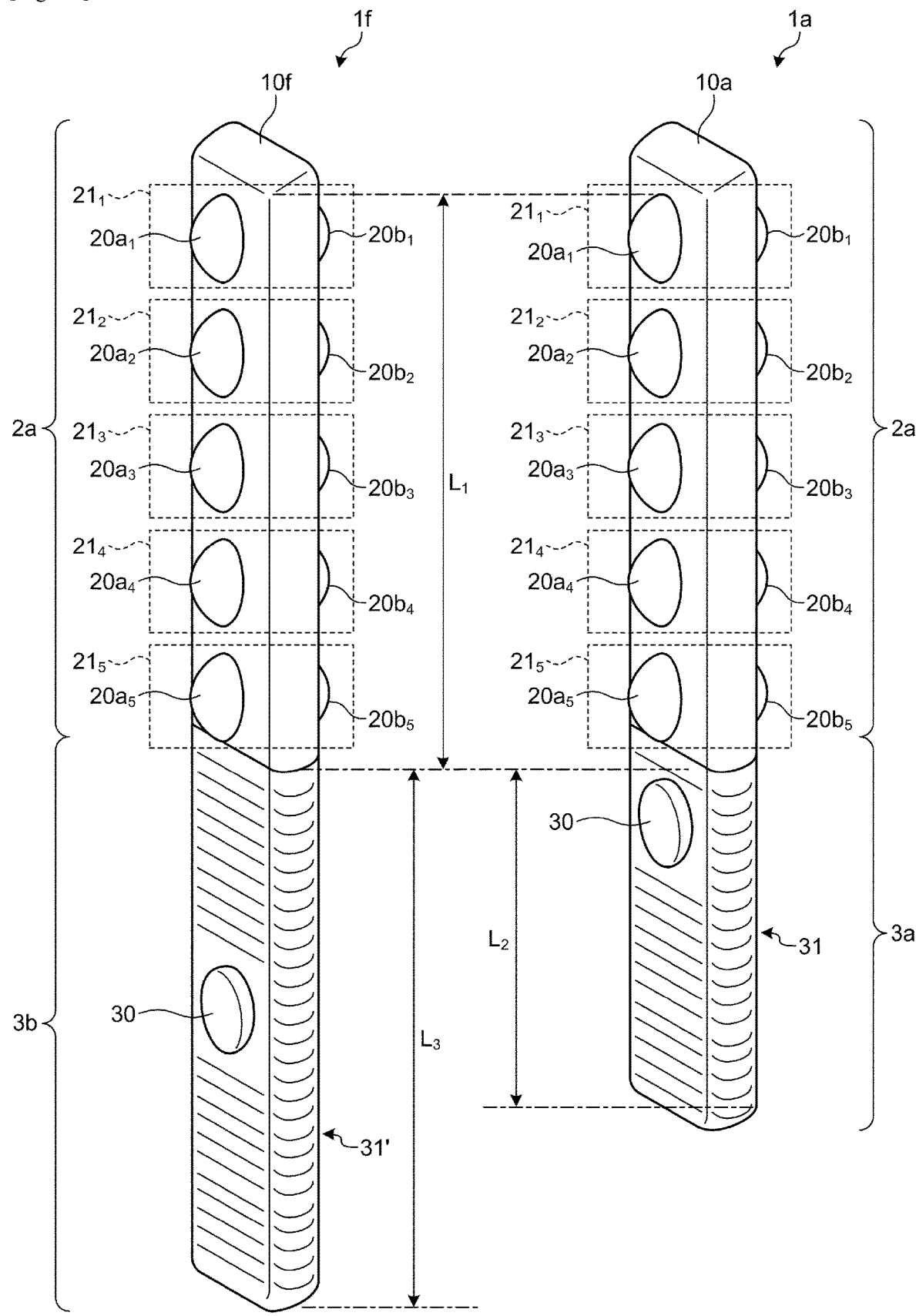
[Fig. 22]

[Fig. 23]
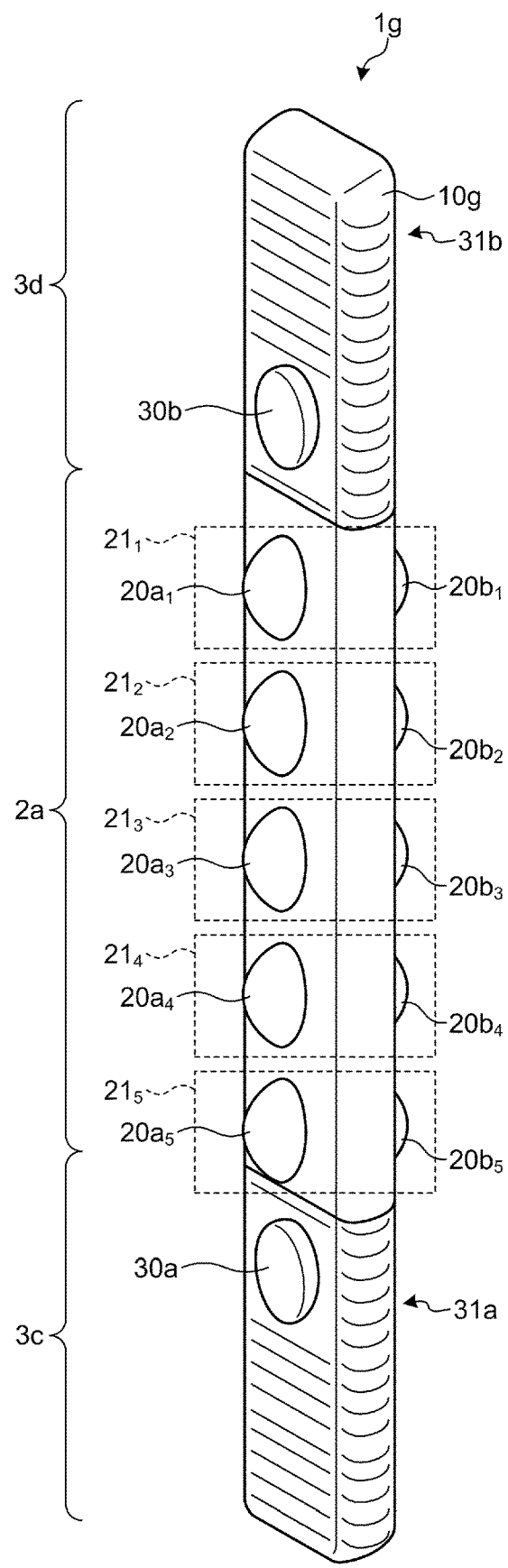

[Fig. 24]
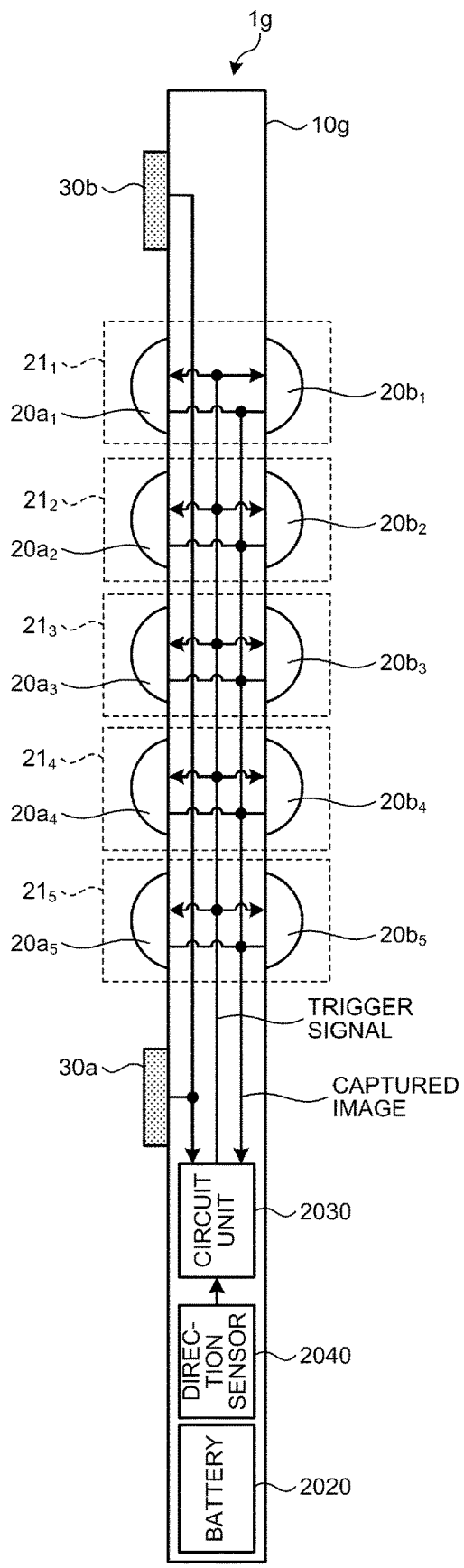

[Fig. 25]
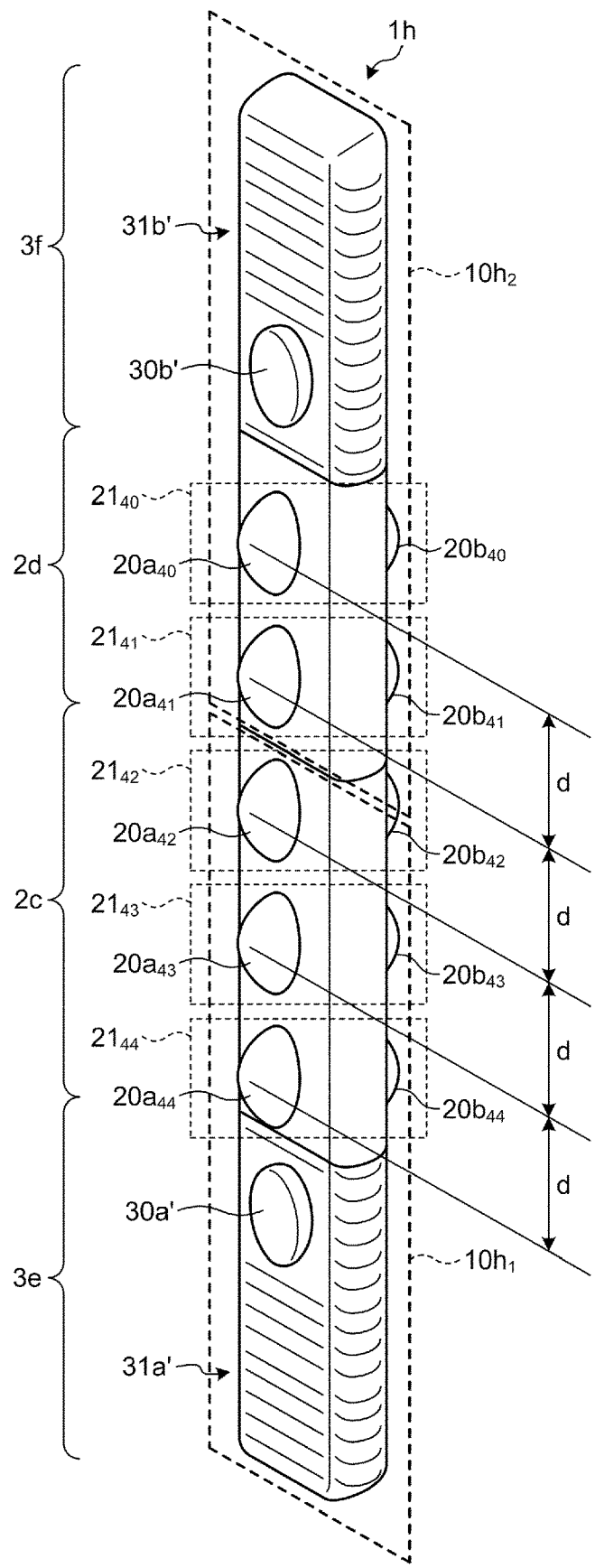

[Fig. 26]
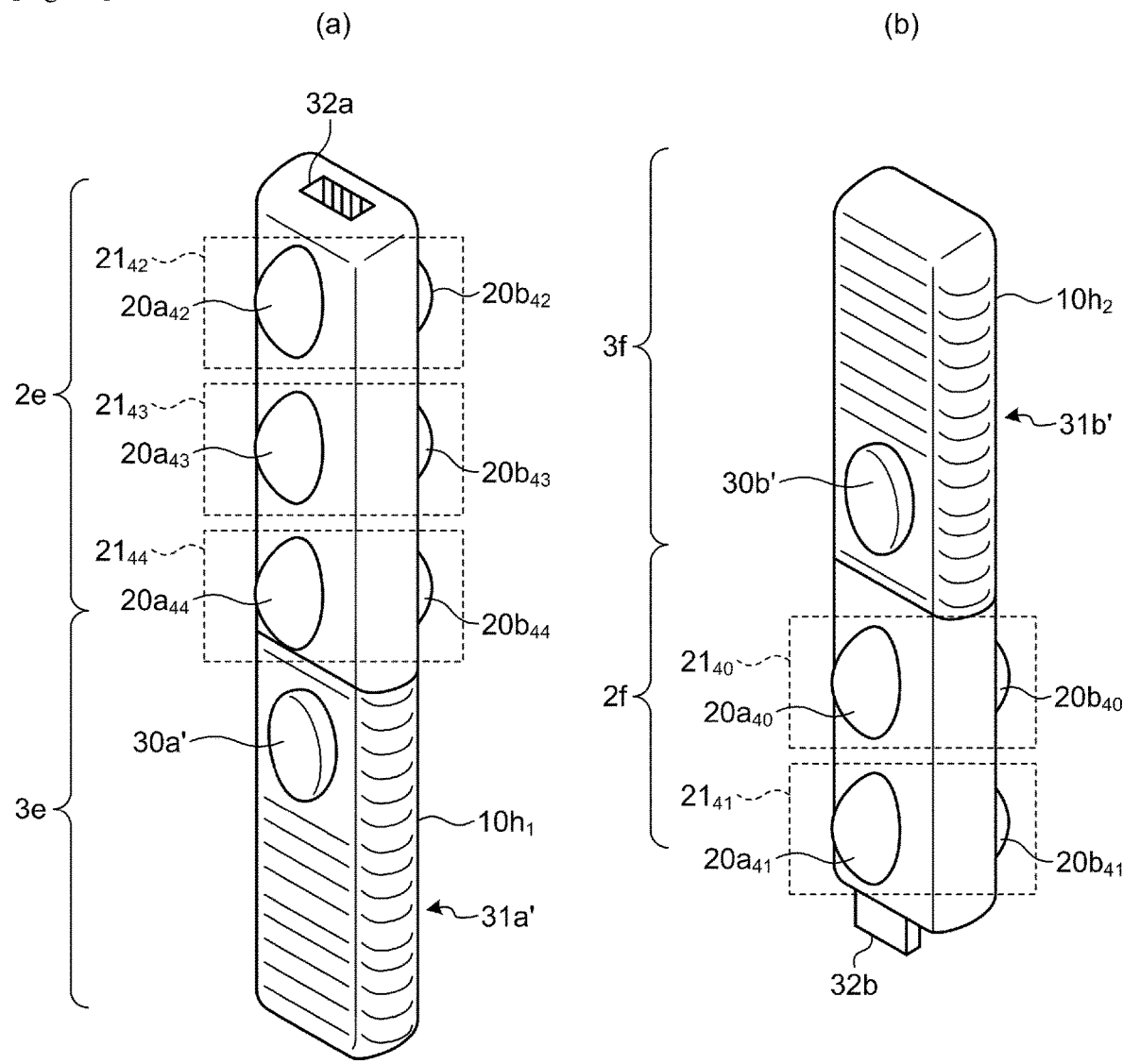

[Fig. 27]
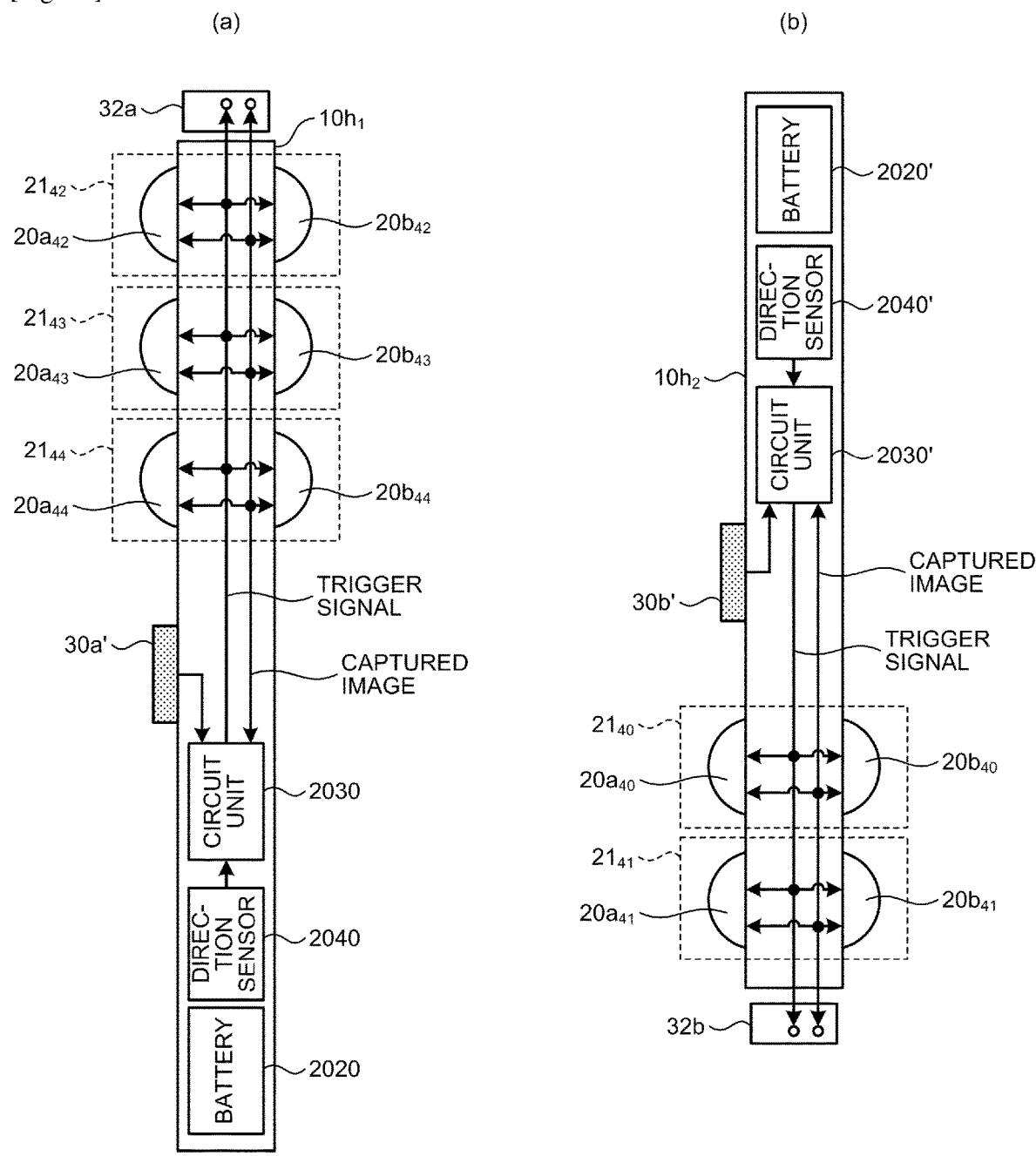

[Fig. 28]
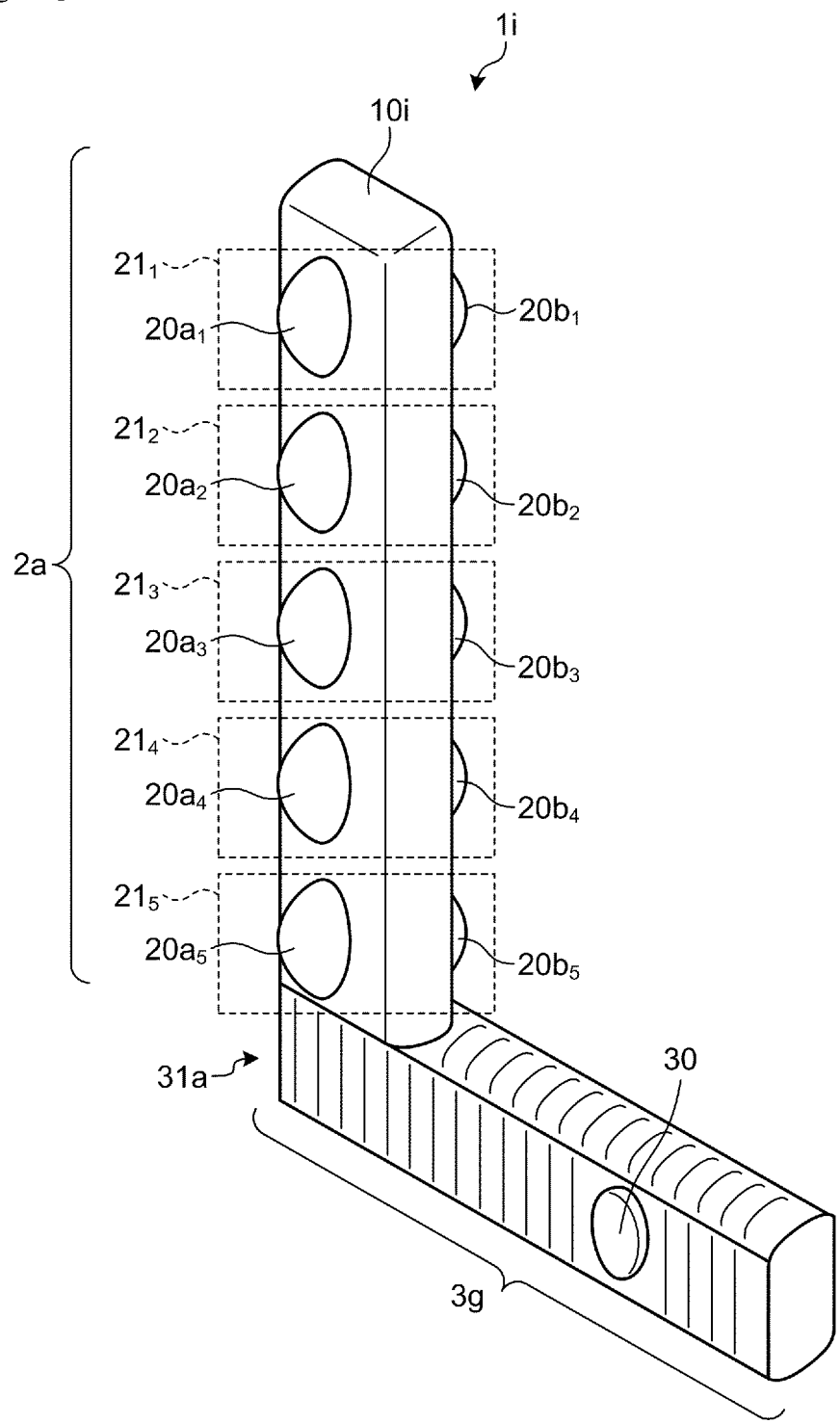

[Fig. 29]
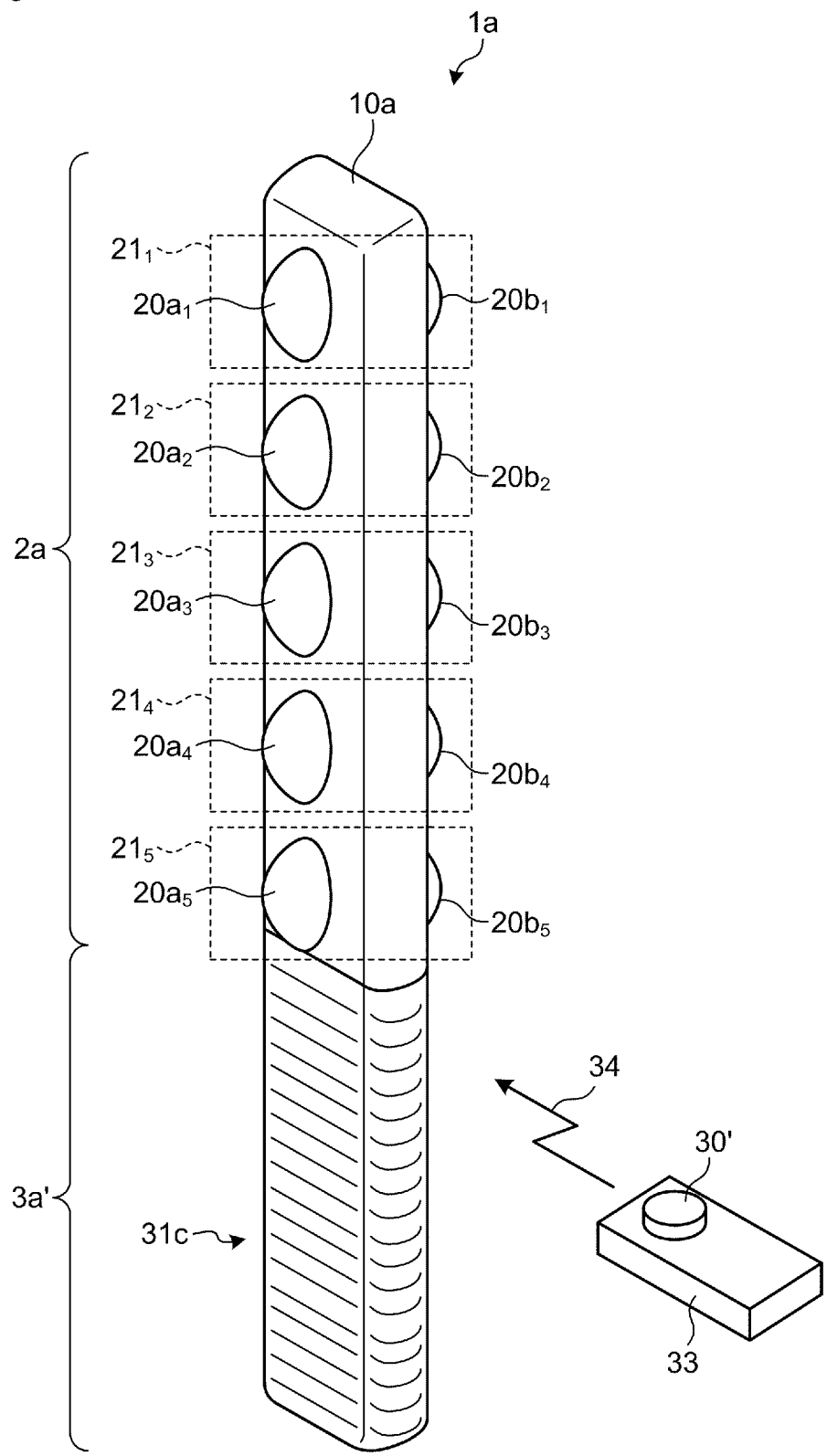

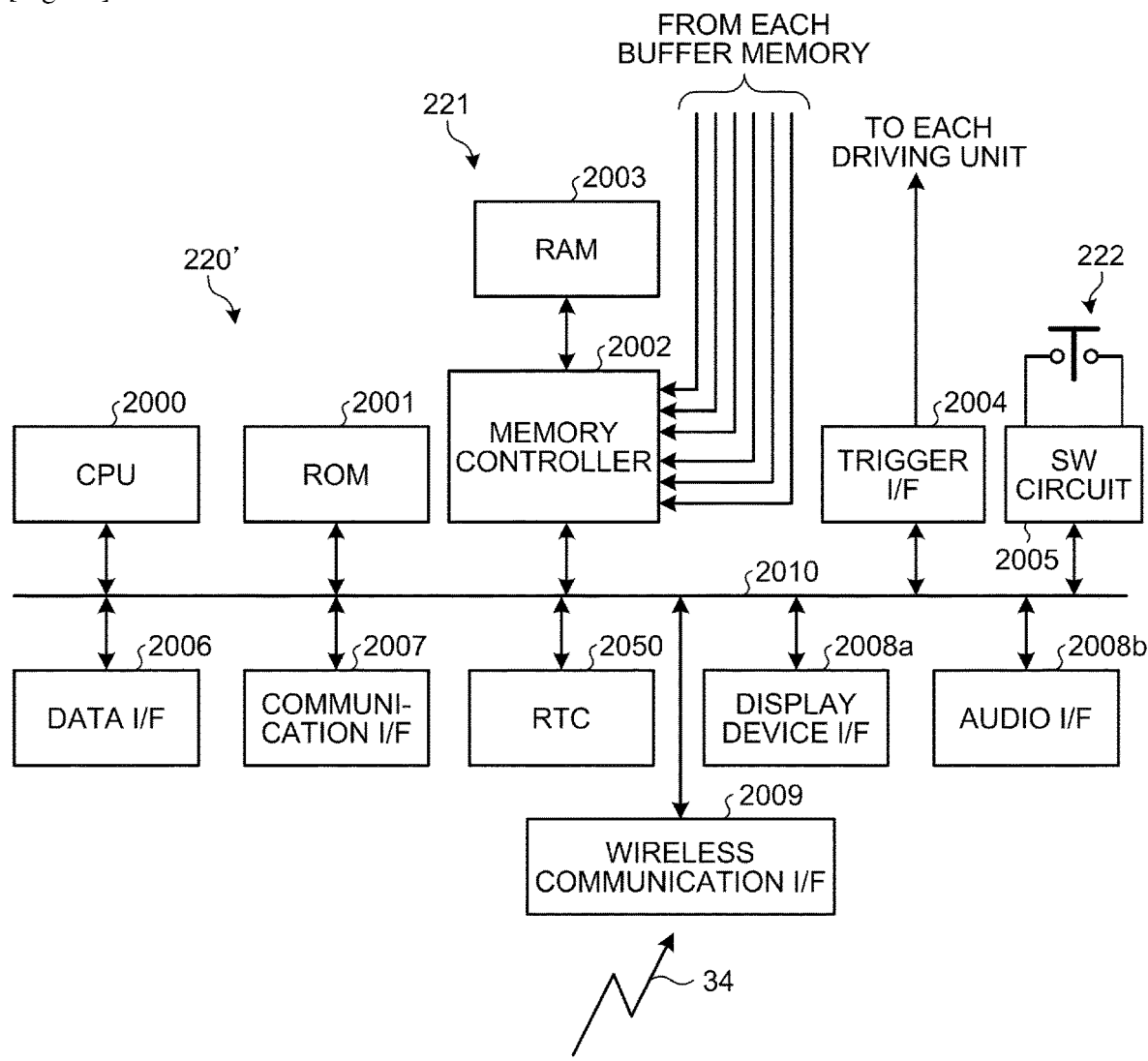
[Fig. 30]

IMAGING APPARATUS

TECHNICAL FIELD

The present invention relates to an imaging apparatus.

BACKGROUND ART

A technology for a three-dimensional reconstruction model is known, in which a real object or building or the whole space including the real object or building is measured using imaging by a camera or laser beam radiation, and three-dimensional information is reconstructed as electronic data based on a measurement result. In recent years, a study has been made of use of the three-dimensional reconstruction model in various situations, such as bridge inspections or building sites. For example, when a large-scale facility, such as a building, is to be built, it may be possible to compare a plan designed using computer-aided design (CAD) with a three-dimensional reconstruction model that is generated based on measurement in a building site. In addition, it may be possible to generate and apply a three-dimensional reconstruction model to check conditions during inspections after construction.

For example, Japanese Patent No. 5011528 discloses a three-dimensional distance measurement sensor that can be applied to acquire three-dimensional reconstruction data. According to Japanese Patent No. 5011528, three cameras each having fisheye lens characteristics are arranged at three viewpoint positions and a three-dimensional distance is calculated based on images captured by the three cameras.

In addition, Japanese Unexamined Patent Application Publication No. 2013-218278 discloses an imaging system that can image the whole surrounding area as a full-spherical image by devising lens configuration methods. By acquiring a plurality of captured images at different viewpoints using the imaging system disclosed in Japanese Unexamined Patent Application Publication No. 2013-218278, it is possible to generate a three-dimensional reconstruction model for a relatively wide range.

SUMMARY OF INVENTION

Technical Problem

In general, a three-dimensional reconstruction model is generated using a plurality of images that are obtained by imaging a target object or space from different viewpoints. Therefore, to generate a three-dimensional reconstruction model for a large-scale object or space, it is necessary to prepare a large-scale apparatus and it takes a long time to acquire data.

For example, conventionally, when a three-dimensional reconstruction model for a large-scale facility is to be generated, a large-scale laser apparatus and a camera apparatus are used in combination and it takes a few hours to few days to acquire data. Therefore, when the conventional technology is used, it is costly to generate a three-dimensional reconstruction model and it is difficult to repeatedly generate the three-dimensional reconstruction model for the same target.

The present invention has been made in view of the foregoing situation, and an object of the invention is to easily acquire images used to generate a three-dimensional reconstruction model.

Solution to Problem

According to one aspect of the present invention, an imaging apparatus includes a plurality of imaging bodies and an imaging control unit. Each of the imaging bodies includes a first optical element capable of imaging a range including a hemisphere that is centered at an optical axis and oriented in a first direction of the optical axis, and a second optical element capable of imaging a range including a hemisphere that is centered at the optical axis and oriented in a second direction opposite to the first direction. The imaging bodies are arrayed in a direction perpendicular to the optical axis. The imaging control unit causes the plurality of imaging bodies to perform imaging in a synchronous manner, and acquires a captured image from each of the imaging bodies.

Advantageous Effects of Invention

According to one aspect of the present invention, it is possible to easily acquire images used to generate a three-dimensional reconstruction model.

BRIEF DESCRIPTION OF DRAWINGS

FIG. 1 is a view schematically illustrating an imaging apparatus according to an embodiment.

FIG. 2 is a view illustrating an example of a configuration of an imaging body applicable to the embodiment.

FIG. 3 is a three-plane view schematically illustrating external appearance of the imaging apparatus according to the embodiment.

FIG. 4 is a view illustrating an example of an imaging range that can be imaged by each of the imaging bodies applicable to the embodiment.

FIG. 5 is a view illustrating connection between an image processing apparatus and an imaging apparatus applicable to the embodiment.

FIG. 6 is a view illustrating examples of images that are captured at five different viewpoints and synthesized for the respective imaging bodies applicable to the embodiment.

FIG. 7 is a flowchart illustrating an example of a three-dimensional reconstruction model generation process applicable to the embodiment.

FIG. 8 is a view for explaining triangulation applicable to the embodiment.

FIG. 9 is a view for explaining the principle of epipolar plane image (EPI) applicable to the embodiment.

FIG. 10 is a view for explaining the principle of EPI applicable to the embodiment.

FIG. 11 is a view for explaining that a slope m is a value based on a curve when whole circumferential images are used for constructing an EPI, which is applicable to the embodiment.

FIG. 12 is a view for explaining that the slope m is a value based on a curve when whole circumferential images are used for constructing an EPI, which is applicable to the embodiment.

FIG. 13 is a view illustrating an example of a plane for which a disparity is preferentially calculated based on an image captured by the imaging apparatus according to the embodiment.

FIG. 14 is a view illustrating an example of a large space including a large building or the like as a target for which a three-dimensional reconstruction model is to be generated in the embodiment.

FIG. 15-1 is a block diagram illustrating an example of a configuration of the imaging apparatus according to the embodiment.

FIG. 15-2 is a block diagram illustrating an example of part of power supply paths in the imaging apparatus according to the embodiment.

FIG. 16 is a block diagram illustrating an example of configurations of a control unit and a memory in the imaging apparatus according to the embodiment.

FIG. 17 is a view illustrating an example of arrangement of a battery and a circuit unit in the imaging apparatus according to the embodiment.

FIG. 18 is a view schematically illustrating external appearance of an imaging apparatus according to a first modification of the embodiment.

FIG. 19 is a view schematically illustrating external appearance of an imaging apparatus according to a second modification of the embodiment.

FIG. 20 is a view schematically illustrating external appearance of an imaging apparatus according to a third modification of the embodiment.

FIG. 21 is a block diagram illustrating an example of a configuration of an imaging apparatus according to a fourth modification of the embodiment.

FIG. 22 is a view schematically illustrating external appearance of an imaging apparatus according to a fifth modification of the embodiment in comparison with the external appearance of the imaging apparatus according to the embodiment.

FIG. 23 is a view schematically illustrating external appearance of an imaging apparatus according to a sixth modification of the embodiment.

FIG. 24 is a view illustrating an example of a circuit configuration of the imaging apparatus according to the sixth modification of the embodiment.

FIG. 25 is a view schematically illustrating external appearance of an imaging apparatus according to a seventh modification of the embodiment.

FIG. 26 is a view schematically illustrating external appearance of the imaging apparatus according to the seventh modification of the embodiment.

FIG. 27 is a view illustrating an example of a circuit configuration of the imaging apparatus according to the seventh modification of the embodiment.

FIG. 28 is a view schematically illustrating external appearance of an imaging apparatus according to an eighth modification of the embodiment.

FIG. 29 is a view schematically illustrating external appearance of an imaging apparatus according to a ninth modification of the embodiment.

FIG. 30 is a view illustrating an example of a circuit configuration of the imaging apparatus according to the ninth modification of the embodiment.

DESCRIPTION OF EMBODIMENTS

Embodiments of an imaging apparatus and an imaging apparatus control method will be described in detail below with reference to the accompanying drawings.

Embodiment

Imaging Apparatus According to an Embodiment

FIG. 1 schematically illustrates an imaging apparatus according to an embodiment. In FIG. 1, an imaging apparatus $1a$ includes a plurality of (in this example, five) imaging lenses $20a_1$, $20a_2$, $20a_3$, $20a_4$, and $20a_5$ and a shutter button 30 on a first surface of a housing $10a$ that is formed in a substantially rectangular solid shape. In the housing $10a$, an imaging element corresponding to each of the imaging lenses $20a_1$, $20a_2$, ..., $20a_5$ is mounted.

Light incident on each of the imaging lenses $20a_1$, $20a_2$, ..., $20a_5$ is emitted to the corresponding imaging element via an image forming optical system that is mounted in the housing $10a$ and includes each of the imaging lenses $20a_1$, $20a_2$, ..., $20a_5$. The imaging element is, for example, a charge coupled device (CCD) and serves as a light-receiving element that converts irradiation light to a charge. The imaging element is not thus limited, but may be a complementary metal oxide (CMOS) image sensor.

In addition, a plurality of imaging lenses $20b_1$, $20b_2$, $20b_3$, $20b_4$, and $20b_5$ are mounted on a second surface on a back surface side of the first surface of the housing $10a$. An imaging element corresponding to each of the imaging lenses $20b_1$, $20b_2$, ..., $20b_5$ is mounted in the housing $10a$, similarly to the imaging lenses $20a_1$, $20a_2$, ..., $20a_5$ described above.

Light incident on each of the imaging lenses $20b_1$, $20b_2$, ..., $20b_5$ is emitted to the corresponding imaging element via an image forming optical systems including each of the imaging lenses $20b_1$, $20b_2$, ..., $20b_5$. Each of the imaging elements converts irradiation light to a charge.

Each of driving units that drives each of the imaging elements performs shutter control on each of the imaging elements in accordance with a trigger signal, and reads the charge converted from the light from each of the imaging elements, which will be described in detail later. Each of the driving units converts the charge read from each of the imaging elements to an electrical signal, converts the electrical signal to a captured image as digital data, and outputs the captured image. Each of the captured images output from each of the driving units is stored in, for example, a memory. An operation of outputting the captured image based on the light incident on the imaging lens $20a_1$ in accordance with the trigger signal for example is described as imaging by the imaging lens $20a_1$ for convenience of explanation.

Assuming that the housing $10a$ is a rectangular solid, surfaces that are in contact with sides (long sides) along a direction in which the imaging lenses $20a_1$, $20a_2$, ..., $20a_5$ are aligned are referred to as side surfaces; a surface that is in contact with upper edges of the first surface, the second surface, and the two side surfaces is referred to as a top surface; and a surface that is in contact with lower edges of the first surface, the second surface, and the two side surfaces is referred to as a bottom surface. In the example in FIG. 1, a surface that is in contact with the upper edges on the side on which the imaging lenses $20a_1$ and $20b_1$ are arranged serves as the top surface; and a surface that is in contact with the lower edges on the side on which the shutter button 30 is arranged serves as the bottom surface.

In the embodiment, the imaging lenses $20a_1$, $20a_2$, ..., $20a_5$ are arranged at equal intervals of a distance d that is a distance between the adjacent imaging lenses. In addition, the imaging lenses $20a_1$ and $20b_1$, the imaging lenses $20a_2$ and $20b_2$, the imaging lenses $20a_3$ and $20b_3$, the imaging lenses $20a_4$ and $20b_4$, and the imaging lenses $20a_5$ and $20b_5$ are arranged in the housing $10a$ at the same heights from the bottom surface of the housing $10a$, for example.

A combination of the imaging lenses at the same height from the bottom surface of the housing $10a$ among the imaging lenses $20a_1$, $20a_2$, ..., $20a_5$ and the imaging lenses $20b_1$, $20b_2$, ..., $20b_5$, and the image forming optical systems and the imaging elements corresponding to the combination of the imaging lenses are collectively referred to as an imaging body (full-spherical imaging unit). In the example in FIG. 1, a combination of the imaging lenses $20a_1$ and $20b_1$, as well as the image forming optical systems and the imaging elements corresponding to the combination are collectively referred to as an imaging body $21_1$. Similarly, combinations of the imaging lenses $20a_2, 20a_3, \ldots, 20a_5$ and the imaging lenses $20b_2, 20b_3, \ldots, 20b_5$, as well as the image forming optical systems and the imaging elements corresponding to the combinations are collectively referred to as imaging bodies $21_2, 21_3, 21_4$, and $21_5$, respectively.

The shutter button 30 is a button for giving an instruction of imaging using each of the imaging lenses $20a_1$, $20a_2, \ldots, 20a_5$ and each of the imaging lenses $20b_1$, $20b_2, \ldots, 20b_5$ in accordance with an operation. When the shutter button 30 is operated, each of the imaging lenses $20a_1, 20a_2, \ldots, 20a_5$ and each of the imaging lenses $20b_1$, $20b_2, \ldots, 20b_5$ perform imaging in a synchronous manner.

As illustrated in FIG. 1, the housing 10a of the imaging apparatus 1a includes an imaging region 2a in which the imaging bodies $21_1$ to $21_5$ are arranged, and an operating region 3a in which the shutter button 30 is arranged. The operating region 3a includes a gripping unit 31 (holding unit) for a user to hold the imaging apparatus 1a.

A surface of the gripping unit 31 is made hard to slip so that a user can easily hold or operate the imaging apparatus 1a. It may be possible to make the gripping unit 31 less slippery than, for example, the imaging region 2a. For example, at least the surface of the gripping unit 31 is made of a hardly slipping material. Examples of the hardly slipping material may possibly include synthesis/natural resin, synthesis/natural leather, wood, cloth, and paper, or materials the surface condition of which imitates the above-described materials. In addition, the surface of the gripping unit 31 may be processed to prevent slippage. An example of processing to prevent slippage may possibly include providing irregularity of a certain pattern on a flat surface.

Furthermore, in the housing 10a, it is preferable that at least the imaging region 2a is made of a material with high shock resistance and less deformation due to temperature change in order to prevent the positions and orientations of the imaging lenses $20a_1$ to $20a_5$ and $20b_1$ to $20b_5$ from changing. Examples of such material may possibly include materials with high elastic modulus (high rigidity), such as aluminum alloy, magnesium alloy, titanium alloy, stainless steel, fiber reinforced resin, and fiber reinforced metal.

Configurations of the imaging bodies $21_1, 21_2, \ldots, 21_5$ will be described in detail below. The imaging bodies $21_1$, $21_2, \ldots, 21_5$ can be implemented using the same configuration; therefore, the imaging bodies $21_1, 21_2, \ldots, 21_5$ will be represented by an imaging body 21 in the description below.

FIG. 2 illustrates an example of the configuration of the imaging body 21 applicable to the embodiment. In FIG. 2, the imaging body 21 includes: image forming optical systems 201a and 201b respectively including imaging lenses 20a and 20b; and imaging elements 200a and 200b each configured by a CCD or CMOS sensor. Each of the image forming optical systems 201a and 201b is configured as a fisheye lens with seven lens elements in six groups, for example. The fisheye lens has a full angle of view equal to or greater than 180 degrees (i.e., 360 degrees/n, where n is the number of optical systems, i.e., 2), or preferably greater than 180 degrees. It is preferable that the fisheye lens has the angle view of 185 degrees or more, and it is more preferable that the fisheye lens has the angle of view of 190 degrees or more.

The image forming optical systems 201a and 201b include prisms 202a and 202b that change optical paths by 90 degrees, respectively. The seven lens elements in six groups of the fisheye lens in each of the image forming optical systems 201a and 201b may be classified into an incident side group and an emission side group (the side of the imaging elements 200a and 200b) by each of the prisms 202a and 202b. For example, light incident on the imaging lens 20a in the image forming optical system 201a enters the prism 202a via each of the lens elements that are classified as the incident side group by the prism 202a. An optical path of the light incident on the prism 202a is changed by 90 degrees, and the light is emitted to the imaging element 200a via each of the lens elements that are classified as the emission side group by the prism 202a and via an aperture stop and a filter.

Positions of the optical elements (the lenses, the prisms 202a and 202b, the filters, and the aperture stops) of the two image forming optical systems 201a and 201b are determined with respect to the imaging elements 200a and 200b. More specifically, the positions are determined such that optical axes of the optical elements of the image forming optical systems 201a and 201b are positioned perpendicular to central portions of respective light receiving regions of the imaging elements 200a and 200b, and the light receiving regions can serve as imaging planes of the respective fisheye lenses. In addition, in the imaging body 21, the image forming optical systems 201a and 201b have the same specification and are assembled in opposite orientations such that the optical axes coincide with each other.

FIG. 3 is a three-plane view schematically illustrating external appearance of the imaging apparatus 1a according to the embodiment. Part (a) of FIG. 3, part (b) of FIG. 3, and part (c) of FIG. 3 are a top view, a front view, and a side view of the imaging apparatus 1a, for example. In part (b) of FIG. 3, the imaging lens $20a_5$ is arranged such that a center of the lens is positioned at a height h from the bottom surface of the housing 10a. With reference to the imaging lens $20a_5$ serving as the origin, the imaging lenses $20a_4, 20a_3, 20a_2$, and $20a_1$ are arranged at intervals of the distance d from the bottom surface side to the top surface side of the housing 10a such that centers of the lenses are aligned with a center line C of the housing 10a in the long side direction.

As illustrated in part (c) of FIG. 3, the imaging lenses $20b_1$ to $20b_5$ are arranged at positions corresponding to the imaging lenses $20a_1$ to $20a_5$ on the back surface sides of the imaging lenses $20a_1$ to $20a_5$, respectively. That is, the imaging lenses $20b_1$ to $20b_5$ are also arranged such that the centers of the lenses are aligned with the center line C as described above. As described above, among the imaging lenses $20a_1$ to $20a_5$ and the imaging lenses $20b_1$ to $20b_5$, the two imaging lenses (for example, the imaging lenses $20a_1$ and $20b_1$) at the same height are included in a single imaging body (for example, the imaging body $21_1$).

In part (a) of FIG. 3 and part (c) of FIG. 3, an example is illustrated in which angles $\alpha$ indicate the angles of view (imaging ranges) of the imaging lenses $20a_1$ and $20b_1$. As described above, the imaging lenses $20a_1$ to $20a_5$ and $20b_1$ to $20b_5$ included in the imaging bodies $21_1$ to $21_5$ each perform imaging with an angle $\alpha$ greater than 180 degrees serving as the angle of view. Thus, in order to prevent the housing 10a from being included in captured images captured by the imaging bodies $21_1$ to $21_5$, the first surface and the second surface of the housing 10a are chamfered at their both sides with respect to the center line C of the imaging lenses $20a_1$ to $20a_5$ and $20b_1$ to $20b_5$ according to the angles of view of the imaging lenses $20a_1$ to $20a_5$ and $20b_1$ to $20b_5$. The chamfered surfaces are indicated as surfaces $23_1, 23_2$, $23_3$, and $23_4$ in part (a) of FIG. 3, part (b) of FIG. 3, and part (c) of FIG. 3.

While an example has been described in which the imaging apparatus 1a includes the five imaging bodies $21_1$ to $21_5$, the embodiment is not limited thereto. That is, the imaging apparatus 1a may include the six or more imaging bodies 21 or the two to four imaging bodies 21, as long as the imaging apparatus 1a includes the plurality of imaging bodies 21.

FIG. 4 illustrates an example of an imaging range that can be imaged by each of the imaging bodies $21_1, 21_2, \ldots, 21_5$ applicable to the embodiment. Each of the imaging bodies $21_1, 21_2, \ldots, 21_5$ has a similar imaging range. In FIG. 4, the imaging ranges of the imaging bodies $21_1, 21_2, \ldots, 21_5$ are represented by the imaging range of the imaging body $21_1$.

Hereinafter, as illustrated in FIG. 4, a direction in which the imaging lenses $20a_1, 20a_2, \ldots, 20a_5$ are aligned is defined as the Z-axis, and a direction of the optical axes of the imaging lenses $20a_1$ and $20b_1$ is defined as the X-axis, for example. In addition, a direction that is included in a plane perpendicular to the Z-axis and that intersects the X-axis at a right angle is defined as the Y-axis.

The combination of the imaging lenses $20a_1$ and $20b_1$ enables the imaging body $21_1$ to have an imaging range of a full sphere centered at the central portion of the imaging body $21_1$. Specifically, the angle of view of each of the imaging lenses $20a_1$ and $20b_1$ is set to be 180 degrees or more, or preferably set to be more than 180 degrees, or more preferably set to be 185 degrees or more as described above. Therefore, the combination of the imaging lenses $20a_1$ and $20b_1$ enables each of an imaging range A on the XY plane and an imaging range B on the XZ plane to be 360 degrees, and the combination of these imaging ranges enables the imaging range of the full sphere.

In other words, the imaging body $21_1$ is able to image a range including a hemisphere that is centered at the optical axis of the imaging lens $20a_1$ and oriented in a first direction of the optical axis, and a range including a hemisphere that is centered at the optical axis of the imaging lens $20b_1$ same as the optical axis of the imaging lens $20a_1$ and oriented in a second direction opposite to the first direction.

In addition, the imaging bodies $21_1, 21_2, \ldots, 21_5$ are arranged at intervals of the distance d in the Z-axis direction. Therefore, captured images obtained by imaging the respective imaging ranges of the full spheres by the imaging bodies $21_1, 21_2, \ldots, 21_5$ are images at different viewpoints that are deviated from one another by the distance d in the Z-axis direction.

In this case, in the embodiment, each of the imaging lenses $20a_1$ to $20a_5$ and each of the imaging lenses $20b_1$ to $20b_5$ perform imaging in a synchronous manner in accordance with an operation of the shutter button 30. Therefore, with use of the imaging apparatus 1a according to the embodiment, five captured images that are captured at the same timing at different viewpoints that are deviated from one another by the distance d in the Z-axis direction are obtained on each of the first surface and the second surface of the housing 10a.

The five captured images that have been captured at the same timing at different viewpoints that are deviated from one another by the distance d in the Z-axis direction are images aligned on the same epipolar line extending in the Z-axis direction.

Three-Dimensional Reconstruction Model Generation Process Applicable to the Embodiment Next, an outline of a three-dimensional reconstruction model generation process using a plurality of images at different viewpoints applicable to the embodiment will be described below. In the embodiment, as illustrated in FIG. 5 for example, an image processing apparatus 100 connected to the imaging apparatus 1a performs the three-dimensional reconstruction model generation process. The image processing apparatus 100 may be configured by executing an image processing program on a personal computer (PC), for example; however, it is not limited thereto. The image processing apparatus 100 may be configured as dedicated hardware for executing the three-dimensional reconstruction model generation process.

For example, the image processing apparatus 100 reads, from a memory of the imaging apparatus 1a, a plurality of captured images (in this example, a total of ten captured images on the first surface and the second surface) that are synchronously captured at different viewpoints and stored in the memory by the imaging apparatus 1a. The image processing apparatus 100 synthesizes, for each of the imaging bodies $21_1, 21_2, \ldots, 21_5$, two captured images that are captured by each of the imaging bodies $21_1, 21_2, \ldots, 21_5$ among the ten images read from the memory of the imaging apparatus 1a, and generates five full-spherical images at different viewpoints that are deviated from one another by the distance d in the Z-axis direction.

The full-spherical image is an image with a solid angle of $4r$ steradian and is obtained by imaging all directions that can be viewed from an imaging position. The image processing apparatus 100 obtains disparities in each of the full-spherical images by using any one of the five full-spherical images as a reference, and generates a three-dimensional reconstruction model based on the obtained disparities.

FIG. 6 illustrates examples of images that are captured at five different viewpoints and synthesized for the respective imaging bodies $21_1, 21_2, \ldots, 21_5$ in the imaging apparatus 1a applicable to the embodiment. Part (a) of FIG. 6 illustrates an example of an object 60. Part (b) of FIG. 6, part (c) of FIG. 6, part (d) of FIG. 6, part (e) of FIG. 6, and part (f) of FIG. 6 illustrate full-spherical images $300_1, 300_2, 300_3, 300_4$, and $300_5$ that are obtained by synthesizing captured images of the same object 60 imaged at five different viewpoints. As illustrated in part (b) of FIG. 6 to part (f) of FIG. 6, each of the full-spherical images $300_1$ to $300_5$ includes an image of the object 60 that is slightly deviated in accordance with the distance d between the imaging bodies $21_1$ to $21_5$.

In FIG. 6, a case is illustrated in which the imaging apparatus 1a images the object 60 that is present on the first surface (front surface) side of the imaging apparatus 1a for the sake of explanation. However, in reality, the imaging apparatus 1a is able to image the object 60 that surrounds the imaging apparatus 1a. In this case, the full-spherical images $300_1$ to $300_5$ are images in the equirectangular projection for example, in each of which the left side and the right side represent the same position and each of the top side and the bottom side represents a single point. That is, some parts that are converted and extracted from images in the equirectangular projection are illustrated as the full-spherical images $300_1$ to $300_5$ in FIG. 6 for the sake of explanation.

A projection method of the full-spherical images $300_1$ to $300_5$ is not limited to the equirectangular projection. For example, the full-spherical images $300_1$ to $300_5$ may be images using the cylindrical projection when it is not necessary to set a large angle of view in the Z-axis direction.

FIG. 7 is a flowchart illustrating an example of the three-dimensional reconstruction model generation process applicable to the embodiment. Each of processes in the flowchart is executed by the image processing apparatus 100, for example. It is assumed that ten captured images captured by the imaging bodies $21_1$ to $21_5$ are already stored in a built-in memory of the imaging apparatus $1a$.

At Step S10, the image processing apparatus 100 acquires each of the captured images captured by each of the imaging bodies $21_1$ to $21_5$ from the imaging apparatus $1a$. The image processing apparatus 100 generates the five full-spherical images $300_1$ to $300_5$ that are captured at a plurality of viewpoints as illustrated in FIG. 6 by synthesizing the acquired captured images for each of the imaging bodies $21_1$ to $21_5$.

At subsequent Step S11, the image processing apparatus 100 selects one of the full-spherical images $300_1$ to $300_5$ generated at Step S10 as a reference full-spherical image (the full-spherical image $300_1$). The image processing apparatus 100 calculates disparities of all of pixels in the other full-spherical images $300_2$ to $300_5$ with respect to the selected reference full-spherical image.

The following describes the principle of a method of calculating disparities applicable to the first embodiment. The basic principle of calculating disparities using captured images captured by an image sensor such as the imaging element $200a$ is a method that uses triangulation. The following describes triangulation with reference to FIG. 8. In FIG. 8, a camera $400a$ includes a lens $401a$ and an imaging element $402a$, and a camera $400b$ includes a lens $401b$ and an imaging element $402b$. Triangulation is used to calculate a distance D from a line connecting the cameras $400a$ and $400b$ to a target 403 on the basis of information on imaging positions in captured images captured by the imaging elements $402a$ and $402b$.

In FIG. 8, a value f indicates a focal length of each of the lenses $401a$ and $401b$. A baseline length B is the length of a line connecting the centers of optical axes of the lenses $401a$ and $401b$. In the examples in FIG. 1 and FIG. 3, the distance d of the intervals between the imaging bodies $21_1$ to $21_5$ corresponds to the baseline length B. A disparity q is the difference between imaging positions $i_1$ and $i_2$ of the target 403 on the imaging elements $402a$ and $402b$, respectively. On the basis of the similarity between triangles, D:f=B:q holds true, and thus the distance D can be calculated by Expression (1).

$$D = \frac{B \times f}{q} \quad (1)$$

In Expression (1), the focal length f and the baseline length B are known. Thus, a problem in this process is to calculate the disparity q. The disparity q is the difference between the imaging positions $i_1$ and $i_2$. Thus, a fundamental problem in calculating the disparity is to identify the correspondence relation between imaging positions of captured images captured by the imaging elements $402a$ and $402b$. In general, a matching process to find corresponding positions among a plurality of images is performed by searching for disparities on epipolar lines on the basis of an epipolar constraint.

It is possible to implement a searching process for disparities using various calculation methods. For example, it may be possible to apply a block matching process using normalized cross correlation (NCC) coefficient as represented by Expression (2) below, or a high-density disparity calculation process using semi global matching (SGM) as represented by Expression (3) and Expression (4) below. It is possible to appropriately select what method is to be used to calculate the disparities depending on usage of a three-dimensional reconstruction model to be generated in the end. In Expression (2) to Expression (4), the value p indicates a pixel position, and the value q indicates a disparity.

$$C(p, q)_{NCC} = \frac{\sum_{j=0}^{N-1} \sum_{i=0}^{M-1} I(i, j) T(i, j)}{\sqrt{\sum_{j=0}^{N-1} \sum_{i=0}^{M-1} I(i, j)^2 \sum_{j=0}^{N-1} \sum_{i=0}^{M-1} T(i, j)^2}} \quad (2)$$

$$C(p, q)_{SGM} = \sum_r L_r(p, q) \quad (3)$$

$$L_r(p, q) = \hat{C}(p, q) + \min(L_r(p-r, q), L_r(p-r, q-1) + P_1, \\ L_r(p-r, q+1) + P_1, \min_i L_r(p-r, i) + P_2) \quad (4)$$

Based on these cost functions, correspondence relations of pixels on epipolar lines are calculated, and a calculation result indicating the highest similarity is selected. In NCC, that is, Expression (2), a pixel position with the largest cost of a numeric value $C(p,q)N_{cc}$ can be regarded as a corresponding point. In SGM, that is, Expression (3) and Expression (4), a pixel position with the smallest cost is regarded as a corresponding point.

As one example, an outline of calculating a disparity using NCC in Expression (2) will be described below. In a block matching method, the following pixel values are obtained: a pixel value of a region extracted as a block of M pixels×N pixels with an optional reference pixel serving as the center of the block in a reference image; and a pixel value of a region extracted as a block of M pixels×N pixels with an optional target pixel serving as the center of the block in a target image. On the basis of the obtained pixel values, a similarity is calculated between the region containing the reference pixel and the region containing the target pixel. The block of M pixels×N pixels is moved in the image of search target, and similarities are compared. The target pixel in the block at a position that provides the highest similarity is selected as the corresponding pixel to the reference pixel.

In Expression (2), a value I(i,j) indicates the pixel value of pixels in a pixel block in the reference image, and a value T(i,j) indicates the pixel value of pixels in a pixel block in the target image. While the pixel block in the target image, which corresponds to the pixel block of M pixels×N pixels in the reference image, is moved by pixel, Expression (2) is calculated to search for a pixel position at which the numeric value $C(p,q)_{NCC}$ takes the largest value.

In a case where the imaging apparatus $1a$ according to the first embodiment is used, the above-described principle of triangulation is basically used to calculate disparities. The imaging apparatus $1a$ includes the five imaging bodies $21_1$ to $21_5$, and is capable of capturing the five full-spherical images $300_1$ to $300_5$ at a time. That is, the imaging apparatus $1a$ according to the first embodiment is capable of capturing three or more captured images at the same time. Thus, the above-described principle of triangulation is extended and applied to the first embodiment.

For example, as indicated in Expression (5) as an example of NCC or in Expression (6) as an example of SGM, it is possible to detect a corresponding point in a captured image captured by each camera by using a cost that is the sum total of costs, each of the costs being a disparity q between cameras apart from each other by the baseline length B.

$$\sum_B 1C_{NCC} \quad (5)$$

$$\sum_B C_{SGM} \quad (6)$$

As one example, a first, a second, and a third cameras are arranged on an epipolar line in the order of the first camera, the second camera, and the third camera. In this case, on each of a pair of the first camera and the second camera, a pair of the first camera and the third camera, and a pair of the second camera and the third camera, a cost is calculated using a method such as NCC or SGM described above. It is possible to calculate a final distance D to a target by calculating the sum total of the costs calculated from the pairs of cameras, and obtaining the smallest value of cost on the basis of the total sum.

A method of calculating the disparities in the embodiment is not limited to the methods described above, and it is possible to apply a stereo image measurement method using an epipolar plane image (EPI). For example, it is possible to generate the EPI by regarding the full-spherical images $300_1$ to $300_5$ that are based on the captured images captured by the imaging bodies $21_1$ to $21_5$ in the imaging apparatus $1a$ as the same image captured by a camera that moves at a uniform velocity. With use of the EPI, it is possible to easily search for corresponding points among the full-spherical images $300_1$ to $300_5$, compared to the method in which triangulation is used as described above, for example.

As one example, with reference to the imaging body $21_1$ for example, each of distances $d_{1-2}$, $d_{1-3}$, $d_{1-4}$, and $d_{1-5}$ between the imaging body $21_1$ and each of the imaging bodies $21_2$ to $21_5$ is calculated in the imaging apparatus $1a$. A spatial image in the three dimensions of the side, the vertical axis (x, y), and a distance D (=0, the distance $d_{1-2}, \ldots, d_{1-5}$) of the full-spherical images $300_1$ to $300_5$ is generated based on the calculation results. A cross-sectional image of the special image on the y-D plane is generated as the EPI.

In the EPI generated as described above, points on an object that is present in each of the original full-spherical images $300_1$ to $300_5$ are represented as a single straight line. The slope of the straight line changes depending on distances from the imaging apparatus $1a$ to the points on the object. Therefore, it is possible to determine corresponding points among the full-spherical images $300_1$ to $300_5$ by detecting a straight line included in the EPI. In addition, it is possible to calculate a distance from the imaging apparatus $1a$ to an object corresponding to the straight line from the slope of the straight line.

The following describes the principle of EPI with reference to FIG. 9 and FIG. 10.

Part (a) of FIG. 9 illustrates a set of a plurality of images $420_1, 420_2, \ldots$ each being a cylindrical image. Part (b) of FIG. 9 schematically illustrates an EPI 422 extracted from the set of images $420_1, 420_2, \ldots$ at a plane 421. In the example in part (a) of FIG. 9, an axis of capturing position of images $420_1, 420_2, \ldots$ is arranged along a depth direction. The set of images $420_1, 420_2, \ldots$ are superimposed to construct three-dimensional data as illustrated in part (a) of FIG. 9. Part of the three-dimensional data extracted from the set of images $420_1, 420_2, \ldots$ at the plane 421 parallel to the depth direction is illustrated in part (b) of FIG. 9 as the EPI 422.

In other words, the EPI 422 is an image constructed by extracting lines having the same X coordinate from the images $420_1, 420_2, \ldots$, and arranging the extracted lines by taking as X coordinates the images $420_1, 420_2, \ldots$ containing the respective lines.

FIG. 10 is a view for explaining the principle of EPI applicable to the first embodiment. Part (a) of FIG. 10 schematically illustrates part (b) of FIG. 9 described above. In part (a) of FIG. 10, the horizontal axis u represents the depth direction in which the images $420_1, 420_2, \ldots$ are superimposed, which indicates disparities. The vertical axis v corresponds to the vertical axis of the images $420_1, 420_2, \ldots$. The EPI 422 represents an image created by superimposing captured images in a direction of the baseline length B.

A change in the baseline length B is represented by a distance $\Delta X$ illustrated in part (b) of FIG. 10. In part (b) of FIG. 10, positions $C_1$ and $C_2$ correspond to the optical centers of the lenses $401a$ and $401b$, respectively, illustrated in FIG. 8, for example. Positions $u_1$ and $u_2$ are positions relative to the positions $C_1$ and $C_2$, respectively, and correspond to the imaging positions $i_1$ and $i_2$, respectively, illustrated in FIG. 8.

By arranging the images $420_1, 420_2, \ldots$ in the direction of the baseline length B as described above, positions of the corresponding points of the images $420_1, 420_2, \ldots$ are represented as a straight line or a curve with a slope m on the EPI 422. This slope m is a disparity q to be used to calculate the distance D. The slope m becomes smaller as the distance D decreases, and becomes larger as the distance D increases. A straight line or a curve with the slope m that is variable in accordance with the distance D is called a feature point trajectory.

The slope m is represented by the following Expression (7). In Expression (7), the value $\Delta u$ indicates the difference between the position $u_1$ and the position $u_2$, which are imaging points, in part (b) of FIG. 10, and can be calculated by Expression (8). The distance D is calculated from the slope m by Expression (9). In Expression (7) to Expression (9), the value v indicates a moving velocity of a camera, and the value f indicates a frame rate of the camera. That is, Expression (7) to Expression (9) are expressions used when whole circumferential images are captured at a frame rate f while the camera is moved at a uniform velocity of v.

$$m = -\frac{\Delta v}{\Delta u} = \frac{-\Delta v}{-\frac{f\Delta X}{D}} = \frac{-\Delta v}{f\Delta X}D \quad (7)$$

$$\Delta u = u2 - u1 = \frac{fx}{D} - \frac{f(\Delta X + X)}{D} = \frac{-f\Delta X}{D} \quad (8)$$

$$D = \frac{f\Delta X}{-\Delta v}m \quad (9)$$

When whole circumferential images are used as images for constructing an EPI, the slope m is a value based on a curve. The following explains this case with reference to FIG. 11 and FIG. 12. In FIG. 11, spheres $411_1$, $411_2$, and $411_3$ indicate full-spherical images captured by a camera #0, a camera #ref, and a camera #(n−1), respectively. The cameras each have the same structure as that of the imaging body 21, and are aligned on a straight line. The interval (baseline length) between the camera #0 and the camera #ref is indicated as a distance $d_2$, and the interval between the camera #ref and the camera #(n−1) is indicated as a distance $d_1$. In the following, the spheres $411_1$, $411_2$, and $411_3$ are referred to as full-spherical images $411_1$, $411_2$, and $411_3$, respectively.

An imaging position on the full-spherical image $411_1$ of a target point P is a position with an angle $\varphi_{n-1}$ with respect to a straight line on which the cameras #0, #ref, and #(n−1) are aligned. Similarly, imaging positions on the full-spherical images $411_2$ and $411_3$ of the target point P are positions with angles $\varphi_{ref}$ and $\varphi_0$, respectively, with respect to the straight line.

In FIG. 12, these angles $\varphi_0$, $\varphi_{ref}$, and $\varphi_{n-1}$ are plotted on the vertical axis, and the positions of the cameras #0, #ref, and #(n−1) are plotted on the horizontal axis. As illustrated in FIG. 12, a feature point trajectory represented by the imaging positions of the full-spherical images $411_1$, $411_2$, and $411_3$, and the positions of the cameras #0, #ref, and #(n−1) is not a straight line but a curve 413 that approximates to straight lines $412_1$ and $412_2$ that connect points.

When the full-spherical images $300_1$ to $300_5$ are used to calculate disparities q for the whole circumference, a method of searching for corresponding points on the curve 413 directly from the full-spherical images $300_1$ to $300_5$ may be used as described above. Alternatively, a method of converting the full-spherical images $300_1$ to $300_5$ for a projection system such as a pinhole projection system, and searching for corresponding points on the basis of the converted images may be used.

In the example in FIG. 11, among the full-spherical images $411_1$, $411_2$, and $411_3$, the full-spherical image $411_2$ is used as the reference image (ret), the full-spherical image $411_1$ as the (n−1)th target image, and the full-spherical image $411_3$ as the 0th target image. On the basis of the full-spherical image $411_2$ serving as the reference image, corresponding points of the full-spherical images $411_1$ and $411_3$ are represented by disparities $q_{n-1}$ and $q_0$, respectively. It is possible to obtain the disparities $q_{n-1}$ and $q_0$ using various known methods including the above-described Expression (2) to Expression (4), for example.

By using EPIs for generating a three-dimensional reconstruction model, it is possible to process a large amount of whole circumferential images in a unified manner. In addition, by using the slope m, the calculation covers more than correspondence of points, making the process robust.

The description now returns to the flow chart in FIG. 7. After the disparity calculation at Step S11, the process of the image processing apparatus 100 proceeds to Step S12. At Step S12, the image processing apparatus 100 performs correction processing on disparity information indicating the disparities calculated at Step S11. As the correction processing on the disparity information, correction based on Manhattan-world assumption, segment correction, or the like may be applied. At subsequent Step S13, the image processing apparatus 100 converts the disparity information subjected to the correction processing at Step S12 to three-dimensional point group information. At subsequent Step S14, the image processing apparatus 100 performs smoothing processing, mesh processing, or the like on the three-dimensional point group information converted from the disparity information at Step S13, if needed. Through the processes to Step S14, a three-dimensional reconstruction model based on the full-spherical images $300_1$ to $300_5$ is generated.

The processes from Step S11 to Step S14 described above may be executed using structure-from-motion (SfM) software, multi-view stereo (MVS) software, or the like distributed in the open source. Image processing performed by the image processing apparatus 100 includes, for example, the SfM software, the MVS software, and the like.

While a case has been described in which the disparity calculation processing at Step S11 is performed by the image processing apparatus 100, it is not limited thereto. That is, the disparity calculation processing at Step S11 may be performed in the imaging apparatus 1a. For example, it may be possible to perform the disparity calculation processing in the imaging apparatus 1a when the number of the imaging bodies $21_1$, $21_2$, . . . is small, when resolution of each of the imaging elements 200a and 200b included in each of the imaging bodies $21_1$, $21_2$, . . . is low, when priority is given to a processing speed rather than reconstruction accuracy, or when a highly capable arithmetic element is mounted on the imaging apparatus 1a, for example.

Furthermore, as described above with reference to FIG. 3 and FIG. 4, each of the imaging bodies $21_1$ to $21_5$ is arranged on the Z-axis in the imaging apparatus 1a according to the embodiment. Therefore, a distance from the imaging apparatus 1a to each of objects is preferentially calculated in a radial direction on a plane 40 illustrated in FIG. 13, where the plane 40 is perpendicular to a direction in which the imaging lenses $20a_1$ to $20a_5$ are aligned. "Preferentially" described herein indicates a capacity for generating the three-dimensional reconstruction model with respect to the angle of view.

That is, as for each of the directions on the plane 40 (radial direction in FIG. 13), the angles of view of the respective imaging bodies $21_1$ to $21_5$ cover the whole circumference of 360 degrees, so that it is possible to calculate distances with respect to the whole circumference. In contrast, as for the Z-axis direction, the angles of view (imaging ranges) of the imaging bodies $21_1$ to $21_5$ largely overlap with one another. Therefore, in the Z-axis direction, disparities are reduced at around the angle of view of 180 degrees in the full-spherical images $300_1$ to $300_5$ that are based on captured images captured by the imaging bodies $21_1$ to $21_5$. Thus, it is difficult to calculate distances for the whole circumference of 360 degrees in the directions on a plane including the Z-axis.

As illustrated in FIG. 14, it is assumed that a large space including large buildings 50, 50, . . . or the like is taken as a target for which a three-dimensional reconstruction model is to be generated. The X-axis, the Y-axis, and the Z-axis illustrated in FIG. 14 respectively coincide with the X-axis, the Y-axis, and the Z-axis illustrated in FIG. 4. In this case, modeling at the full angle of view (360 degrees) is performed in the directions on the plane 40 represented by the X-Y axes. Therefore, it is preferable to arrange the plurality of imaging bodies $21_1$ to $21_5$ so as to be aligned in the Z-axis direction perpendicular to the plane 40.

Configuration related to signal processing performed by the imaging apparatus according to the embodiment Next, a configuration related to signal processing performed by the imaging apparatus 1a according to the embodiment will be described. FIG. 15-1 illustrates an example of a configuration of the imaging apparatus 1a according to the embodiment. In FIG. 15-1, components corresponding to the components illustrated in FIG. 1 and FIG. 2 described above are denoted by the same reference signs, and detailed explanation thereof will be omitted.

In FIG. 15-1, the imaging apparatus 1a includes imaging elements $200a_1$, $200a_2$, . . . , $200a_5$, imaging elements $200b_1$, $200b_2$, . . . $200b_5$, driving units $210a_1$, $210a_2$, . . . , $210a_5$, driving units $210b_1, 210b_2, \ldots, 210b_5$, buffer memories $211a_1, 211a_2, \ldots, 211a_5$, and buffer memories $211b_1, 211b_2, \ldots, 211b_5$.

Among the components described above, the imaging elements $200a_1, 200a_2, \ldots, 200a_5$, the driving units $210a_1, 210a_2, \ldots, 210a_5$, and the buffer memories $211a_1, 211a_2, \ldots, 211a_5$ are components corresponding to the imaging lenses $20a_1, 20a_2, \ldots, 20a_5$, and included in the imaging bodies $21_1, 21_2, \ldots, 21_5$, respectively. In FIG. 15, only the imaging body $21_1$ among the imaging bodies $21_1$ to $21_5$ is illustrated for the sake of simplicity.

Similarly, the imaging elements $200b_1, 200b_2, \ldots, 200b_5$, the driving units $210b_1, 210b_2, \ldots, 210b_5$, and the buffer memories $211b_1, 211b_2, \ldots, 211b_5$ are components corresponding to the imaging lenses $20b_1, 20b_2, \ldots, 20b_5$, and included in the imaging bodies $21_1, 21_2, \ldots, 21_5$, respectively.

The imaging apparatus 1a further includes a control unit 220, a memory 221, and a switch (SW) 222. The switch 222 corresponds to the shutter button 30 illustrated in FIG. 1. For example, a closed state of the switch 222 corresponds to a state in which the shutter button 30 is operated.

The imaging apparatus 1a may further include a display unit 223 and a sound input/output unit 224. The display unit 223 includes, for example, a display device such as a light emitting diode (LED) and a driving circuit for the display device. The display unit 223 displays, for example, a state of the imaging apparatus 1a under the control of the control unit 220. The sound input/output unit 224 includes, for example, a microphone, a speaker, and a sound processing circuit. The sound input/output unit 224 captures a sound generated outside the imaging apparatus 1a into the imaging apparatus 1a, and outputs a sound generated inside the imaging apparatus 1a to the outside, for example.

The imaging body $21_1$ will be described below. The imaging body $21_1$ includes the imaging element $200a_1$, the driving unit $210a_1$, the buffer memory $211a_1$, the imaging element $200b_1$, the driving unit $210b_1$, and the buffer memory $211b_1$.

The driving unit $210a_1$ drives the imaging element $200a_1$ and reads a charge from the imaging element $200a_1$ in accordance with a trigger signal supplied from the control unit 220. The driving unit $210a_1$ converts the charge read from the imaging element $200a_1$ to an electrical signal, further converts the electrical signal to a captured image that is digital data, and outputs the captured image. The driving unit $210a_1$ outputs a captured image of one frame based on the charge read from the imaging element $200a_1$ in response to a single trigger signal.

The buffer memory $211a_1$ is a memory capable of storing at least the captured image of one frame. The captured image output from the driving unit $210a_1$ is temporarily stored in the buffer memory $211a_1$.

In the imaging body $21_1$, the imaging element $200b_1$, the driving unit $210b_1$, and the buffer memory $211b_1$ respectively have the same functions as those of the imaging element $200a_1$, the driving unit $210a_1$, and the buffer memory $211a_1$ as described above, and therefore, explanation thereof will be omitted. In addition, the other imaging bodies $21_2$ to $21_5$ have the same functions as those of the imaging body $21_1$, and therefore, explanation thereof will be omitted.

The control unit 220 controls the entire operation of the imaging apparatus 1a. Upon detecting transition from an opened state to the closed state of the switch 222, the control unit 220 outputs a trigger signal. The trigger signal is simultaneously supplied to each of the driving units $210a_1, 210a_2, \ldots, 210a_5$ and the driving units $210b_1, 210b_2, \ldots, 210b_5$.

The memory 221 reads a captured image from each of the buffer memories $211a_1, 211a_2, \ldots, 211a_5$ and each of the buffer memories $211b_1, 211b_2, \ldots, 211b_5$ under the control of the control unit 220 in accordance with the output of the trigger signal, and stores each of the read captured images. Each of the captured images stored in the memory 221 can be read by the image processing apparatus 100 that is connected to the imaging apparatus 1a as described above with reference to FIG. 5 for example.

In this manner, the control unit 220 functions as an imaging control unit that controls imaging performed by each of the imaging bodies $21_1$ to $21_5$ and acquires captured images.

A battery 2020 is, for example, a secondary battery, such as a lithium-ion secondary battery, and serves as a power supply unit that supplies electrical power to a unit that needs to be supplied with power in the imaging apparatus 1a. The battery 2020 includes a charge/discharge control circuit that controls charge and discharge of a secondary battery.

FIG. 15-2 illustrates an example of power supply paths from the battery 2020 to the components in the imaging apparatus 1a. In FIG. 15-2, the signal paths between the components illustrated in FIG. 15-1 are omitted for the sake of simplicity. As illustrated in FIG. 15-2, the battery 2020 supplies electrical power to the driving units $211a_1$ to $211a_5$, the driving units $211b_1$ to $211b_5$, the buffer memories $211a_1$ to $211a_5$, and the buffer memories $211b_1$ to $211b_5$ in the imaging bodies $21_1, 21_2, \ldots, 21_5$. The imaging elements $200a_1$ to $200a_5$ and the imaging elements $200b_1$ to $200b_5$ are driven by electrical power supplied from the driving units $211a_1$ to $211a_5$ and the driving units $211b_1$ to $211b_5$, respectively. The battery 2020 further supplies electrical power to the control unit 220, the memory 221, the display unit 223, and the sound input/output unit 224. Electrical power is supplied from the battery 2020 to the components via respective independent wires or a flexible substrate including a plurality of wires, for example.

FIG. 16 illustrates an example of configurations of the control unit 220 and the memory 221 in the imaging apparatus 1a according to the embodiment. In FIG. 16, the control unit 220 includes a central processing unit (CPU) 2000, a read only memory (ROM) 2001, a trigger interface (I/F) 2004, a switch (SW) circuit 2005, a data I/F 2006, a communication I/F 2007, a display device I/F 2008a, an audio I/F 2008b, and a real time clock (RTC) 2050, all of which are communicably connected to a bus 2010. The memory 221 includes a random access memory (RAM) 2003 and a memory controller 2002. The memory controller 2002 is also connected to the bus 2010. The battery 2020 supplies electrical power to the CPU 2000, the ROM 2001, the memory controller 2002, the RAM 2003, the trigger I/F 2004, the switch circuit 2005, the data I/F 2006, the communication I/F 2007, the display device I/F 2008a, the audio I/F 2008b, the bus 2010, and the RTC 2050.

The CPU 2000 operates using a part of the storage area of the RAM 2003 as a working memory in accordance with a program that is stored in advance in the ROM 2001 for example, and controls the entire operation of the imaging apparatus 1a. The memory controller 2002 controls storing and reading of data in and from the RAM 2003 in accordance with an instruction from the CPU 2000. The memory controller 2002 also controls reading of a captured image from each of the buffer memories $211a_1, 211a_2, \ldots, 211a_5$ and each of the buffer memories $211b_1$, $211b_2$, ..., $211b_5$ in accordance with an instruction from the CPU 2000.

The switch circuit 2005 detects transition between the closed state and the opened state of the switch 222, and sends a detection result to the CPU 2000. Upon receiving the detection result indicating that the switch 222 is transitioned from the opened state to the closed state from the switch circuit 2005, the CPU 2000 outputs a trigger signal. The trigger signal is output via the trigger I/F 2004, and divided and supplied to each of the driving units $210a_1$, $210a_2$, ..., $210a_5$ and each of the driving units $210b_1$, $210b_2$, ..., $210b_5$.

The data I/F 2006 is an interface for performing data communication with an external apparatus. As the data I/F 2006, a universal serial bus (USB) may be applied, for example. The communication I/F 2007 is connected to a network, and controls communication over the network. The network connected to the communication I/F 2007 may be either a wired network or a wireless network, or the communication I/F 2007 may be connected to both of a wired network and a wireless network. The image processing apparatus 100 described above is connected to the imaging apparatus 1a via at least one of the data I/F 2006 and the communication I/F 2007.

While an example has been described in which the CPU 2000 outputs the trigger signal in accordance with the detection result sent from the switch circuit 2005, the present invention is not limited to this example. For example, the CPU 2000 may output a trigger signal in accordance with a signal that is supplied via the data I/F 2006 or the communication I/F 2007. Furthermore, the trigger I/F 2004 may generate a trigger signal in accordance with the detection result sent from the switch circuit 2005, and supply the trigger signal to each of the driving units $210a_1$, $210a_2$, ..., $210a_5$ and each of the driving units $210b_1$, $210b_2$, ..., $210b_5$.

The display device I/F 2008a is an interface for the display unit 223. The display device I/F 2008a converts a display control signal generated by the CPU 2000 to a signal that can be displayed by the display device included in the display unit 223. The audio I/F 2008b is an interface for the sound input/output unit 224. The audio I/F 2008b includes an analog/digital (A/D) converter for converting an analog audio signal to a digital audio signal, and an digital/analog (D/A) converter for converting a digital audio signal to an analog audio signal. The RTC 2050 measures time by counting a clock.

With this configuration, upon detecting that the switch 222 is transitioned from the opened state to the closed state, the control unit 220 generates and outputs a trigger signal. The trigger signal is supplied to each of the driving units $210a_1$, $210a_2$, ..., $210a_5$ and each of the driving units $210b_1$, $210b_2$, ..., $210b_5$ at the same timing. Each of the driving units $210a_1$, $210a_2$, ..., $210a_5$ and the driving units $210b_1$, $210b_2$, ..., $210b_5$ reads a charge from each of the imaging elements $200a_1$, $200a_2$, ..., $200a_5$ and the imaging elements $200b_1$, $200b_2$, ..., $200b_5$ in synchronization with the supplied trigger signal.

Each of the driving units $210a_1$, $210a_2$, ..., $210a_5$ and the driving units $210b_1$, $210b_2$, ..., $210b_5$ converts the charge read from each of the imaging elements $200a_1$, $200a_2$, ..., $200a_5$ and the imaging elements $200b_1$, $200b_2$, ..., $200b_5$ to a captured image, and stores the captured image obtained through the conversion in each of the buffer memories $211a_1$, $211a_2$, ..., $211a_5$ and the buffer memories $211b_1$, $211b_2$, ..., $211b_5$.

The control unit 220 instructs the memory 221 to read the captured image from each of the buffer memories $211a_1$, $211a_2$, ..., $211a_5$ and each of the buffer memories $211b_1$, $211b_2$, ..., $211b_5$ at a predetermined timing after the trigger signal has been output. In the memory 221, the memory controller 2002 reads the captured image from each of the buffer memories $211a_1$, $211a_2$, ..., $211a_5$ and each of the buffer memories $211b_1$, $211b_2$, ..., $211b_5$ in accordance with the instruction, and stores each of the read captured images in a predetermined area of the RAM 2003.

When the image processing apparatus 100 is connected to the imaging apparatus 1a via the data I/F 2006 for example, the image processing apparatus 100 issues, via the data I/F 2006, a request to read each of the captured images stored in the RAM 2003. The CPU 2000 instructs the memory controller 2002 to read each of the captured images from the RAM 2003 in response to the request. The memory controller 2002 reads each of the captured images from the RAM 2003 in accordance with the instruction, and transmits each of the read captured images to the image processing apparatus 100 via the data I/F 2006. The image processing apparatus 100 performs the processing illustrated in the flowchart of FIG. 7 based on each of the captured images transmitted from the imaging apparatus 1a.

FIG. 17 illustrates an arrangement example of the battery 2020 and a circuit unit 2030 (control unit) in the imaging apparatus 1a according to the embodiment. As illustrated, the battery 2020 and the circuit unit 2030 are provided inside the housing 10a. Out of the battery 2020 and the circuit unit 2030, at least the battery 2020 is fixed to the inside of the housing 10a with a fixing member such as adhesive or a screw. FIG. 17 corresponds to part (b) of FIG. 3 described above, and illustrates an example of the imaging apparatus 1a viewed from the front surface. The circuit unit 2030 includes at least each of the elements of the control unit 220 and the memory 221 as described above. The control unit 220 and the memory 221 are configured on one or a plurality of circuit boards, for example. As illustrated in FIG. 17, in the imaging apparatus 1a, the battery 2020 and the circuit unit 2030 are arranged on an extended line of the line on which the imaging lenses $20a_1$, $20a_2$, ..., $20a_5$ are aligned.

While an example has been described in which the battery 2020 and the circuit unit 2030 are arranged at these positions, the present invention is not limited to this example. For example, if the circuit unit 2030 is adequately small in size, it is sufficient that at least the battery 2020 is arranged at this position.

By arranging the battery 2020 and the circuit unit 2030 as described above, it is possible to reduce a horizontal width (width in the Y-axis in FIG. 4) of the surfaces (the front surface and the back surface) of the imaging apparatus 1a on which each of the imaging lenses $20a_1$, $20a_2$, ..., $20a_5$ (and each of the imaging lenses $20b_1$, $20b_2$, ..., $20b_5$) is arranged. With this configuration, it is possible to prevent a part of the housing 10a of the imaging apparatus 1a from being included in each of the captured images captured by each of the imaging bodies $21_1$, $21_2$, ..., $21_5$. Consequently, it is possible to calculate disparities with higher accuracy.

Furthermore, it is preferable to reduce the horizontal width of the housing 10a of the imaging apparatus 1a as much as possible for the same reason.

As described above, the imaging apparatus 1a according to the embodiment includes the plurality of imaging bodies $21_1$, $21_2$, ..., $21_5$, each of which is able to image a full sphere at a different viewpoint. The imaging bodies $21_1$, $21_2$, ..., $21_5$ perform imaging in a synchronous manner in response to a single operation of the shutter button 30.

Therefore, it is possible to synchronously acquire the plurality of full-spherical images $300_1$ to $300_5$ at different viewpoints, and prevent an influence of a temporal change in an imaging environment.

Furthermore, relative positions of the imaging bodies $21_1$, $21_2$, ..., $21_5$ are fixed in the imaging apparatus $1a$ according to the embodiment. Therefore, with use of the imaging apparatus $1a$ according to the embodiment, it is not necessary to perform high-accuracy processing for estimating a movement amount of a viewpoint, as compared to a case in which an imaging apparatus including the single imaging body 21 is moved to capture images at different viewpoints, for example.

Moreover, the imaging apparatus $1a$ according to the embodiment is able to calculate disparities using the plurality of full-spherical images $300_1$ to $300_5$ that are based on the plurality of captured images captured by the imaging bodies $21_1$, $21_2$, ..., $21_5$ whose relative positions are already known. Therefore, it is possible to increase the reliability of each of the full-spherical images $300_1$ to $300_5$ used for the disparity calculation. Consequently, it is possible to reduce noise in the disparity calculation.

Furthermore, the imaging apparatus $1a$ according to the embodiment is able to perform processing simultaneously by dividing a distance range among the imaging bodies $21_1$, $21_2$, ..., $21_5$. Therefore, it is possible to reduce processing time.

For example, there is an increasing demand to acquire data on tourism destinations, real estates, inspections, or the like depending on seasons, time of year, time of day, or the like, and analyze and record changes in the data. However, conventionally, it is necessary to prepare a large-scale apparatus and it takes a long time to acquire data in order to generate a three-dimensional reconstruction model; therefore, it is difficult to meet the demand mentioned above. Meanwhile, when a three-dimensional reconstruction model for a small-scale object is to be generated, it is general to use a captured image and the SfM technology.

However, in a large space or a wide distance range situation corresponding to tourism destinations, real estates, inspections, or the like as described above, a large amount of captured images are needed in terms of limitation on the angle of view and accuracy of the SfM. If the three-dimensional reconstruction model generation process is performed on a large amount of captured images, long processing time may be needed or an environment may be changed during acquisition of the large amount of captured images, and in some cases, the process may not be performed normally.

In the imaging apparatus $1a$ according to the embodiment, it is possible to perform imaging in a synchronous manner by the plurality of imaging bodies $21_1$ to $21_5$ at different viewpoints. Therefore, it is possible to reduce time taken for the imaging, and even when a large amount of captured images are needed, it is possible to prevent a change in imaging conditions due to an environmental change. Furthermore, it is possible to easily calculate disparities based on the captured images because the relative positions of the imaging bodies $21_1$ to $21_5$ are fixed.

In addition, it may be possible to generate a combination of a plurality of full-spherical images from the full-spherical images $300_1$ to $300_5$ that are based on the captured images captured by the plurality of imaging bodies $21_1$, $21_2$, ..., $21_5$ included in the imaging apparatus $1a$ according to the embodiment, and perform a disparity calculation process on an identical point among the plurality of full-spherical images included in the generated combination.

For example, a combination including the full-spherical images $300_1$ and $300_2$, a combination including the full-spherical images $300_2$ and $300_3$, a combination including the full-spherical images $300_3$ and $300_4$, and a combination including the full-spherical images $300_4$ and $300_5$ are generated from the full-spherical images $300_1$ to $300_5$. In each of the generated combinations, disparities are calculated at identical points among the plurality of full-spherical images of the combination. By performing a filtering process on the plurality of calculated disparities in each of the combinations, it is possible to improve the stability of distance calculation as compared to a case in which the disparities are calculated using a full-spherical image that is based on the captured image captured by a single imaging body. As the filtering process, various methods, such as a median filtering process or a moving average filtering process, may be applied.

In the imaging apparatus $1a$ according to the embodiment, it is preferable that the image forming optical systems $201a$ and $201b$ included in the imaging body 21 are configured such that a difference in the resolution (blurring) between a peripheral angle of view and a central angle of view is small. As a technology for reducing the difference in the resolution between the peripheral angle of view and the central angle of view, technologies disclosed in Japanese Patent No. 5783314 and Japanese Patent No. 5839135 may be applied.

In addition, it is preferable that each of the captured images used to generate a full-spherical image is calibrated such that the captured images are related to one another so as to realize connection as the whole circumference and the captured images are arrayed in accordance with design values. The calibration on the full-spherical image is performed such that a certain imaging body (for example, the imaging body $21_5$ arranged at the bottommost position) among the imaging bodies $21_1$ to $21_5$ is taken as a reference, and each of the captured images captured by each of the imaging bodies $21_1$ to $21_4$ are corrected so as to be arrayed on a straight line with respect to the captured image captured by the reference imaging body $21_5$. It is important to perform correction such that all of the imaging bodies $21_1$ to $21_5$ are arrayed on a straight line, instead of performing correction on only adjacent imaging bodies, in order to make the disparity calculation easy.

First Modification of the Embodiment

Next, a first modification of the embodiment will be described. FIG. 18 schematically illustrates external appearance of an imaging apparatus according to the first modification of the embodiment. In FIG. 18, an imaging apparatus $1b$ includes a plurality of (in this example, six) imaging lenses $20a_{10}$, $20a_{11}$, $20a_{12}$, $20a_{13}$, $20a_{14}$, and $20a_{15}$ and the shutter button 30 on a first surface (front surface) of a housing $10b$ that is formed in a substantially rectangular solid shape, similarly to the imaging apparatus $1a$ illustrated in FIG. 1.

In addition, similarly to the imaging apparatus $1a$ described above, the imaging apparatus $1b$ includes imaging lenses $20b_{10}$, $20b_{11}$, $20b_{12}$, $20b_{13}$, $20b_{14}$ and $20b_{15}$, each of which is mounted on a second surface (back surface) of the housing $10b$ at the same height as each of the imaging lenses $20a_{10}$, $20a_{11}$, $20a_{12}$, $20a_{13}$, $20a_{14}$, and $20a_{15}$ from the bottom surface, for example.

Each of imaging bodies $21_{10}$, $21_{11}$, $21_{12}$, $21_{13}$, $21_{14}$, and $21_{15}$ is constituted by a combination of the imaging lenses at the same height from the bottom surfaces of the housing $10b$ among the imaging lenses $20a_{10}$, $20a_{11}$, $20a_{13}$, $20a_{14}$, and $20a_{15}$ and the imaging lenses $20b_{10}$, $20b_{11}$, $20b_{12}$, $20b_{13}$, $20b_{14}$, and $20b_{15}$, and the image forming optical systems and the imaging elements corresponding to the combination of the imaging lenses. An imaging region $2b$ includes the six imaging bodies $21_{10}$, $21_{11}$, $21_{12}$, $21_{13}$, $21_{14}$, and $21_{15}$.

The structure and the configuration of each of the imaging bodies $21_{10}$ to $21_{15}$ are the same as the configuration of the imaging body 21 described above with reference to FIG. 2 and the configuration of the imaging body $21_1$ described above with reference to FIG. 15, and therefore, explanation thereof will be omitted. Furthermore, as for the arrangement of each of the imaging bodies $21_{10}$ to $21_{15}$, the imaging bodies $21_{10}$ to $21_{15}$ are arranged from the bottom surface side to the top surface side of the housing $10b$ such that centers of the lenses are aligned with a center line of the housing $10b$ in the long side direction as described above with reference to FIG. 1 and FIG. 3. Moreover, as for the configuration of the imaging apparatus $1b$, substantially the same configuration as the configuration described above with reference to FIG. 15 and FIG. 16 is applicable, and therefore, explanation thereof will be omitted.

In the first modification of the embodiment, arrangement intervals between the imaging bodies $21_{10}$ to $21_{15}$ (each of the imaging lenses $20a_{10}$ to $20a_{15}$ and each of the imaging lenses $20b_{10}$ to $20b_{15}$) are different from that of the embodiment described above. Specifically, in the imaging apparatus $1b$ according to the first modification of the embodiment, the imaging lenses $20a_{10}$ to $20a_{15}$ include an imaging lens for which an interval from an adjacent imaging lens on one side and an interval from an adjacent imaging lens on the other side are different, for example.

In the example illustrated in FIG. 18, intervals between the imaging lenses $20a_{10}$ to $20a_{15}$ are denoted by distances $d_1$, $d_2$, $d_3$, $d_4$, and $d_5$. In this example, a relationship among the distances $d_1$ to $d_5$ is represented by Expression (10) below.

$$d_1 > d_2 > d_3 > d_4 = d_5 \qquad (10)$$

The image processing apparatus 100 acquires a captured image captured by each of the imaging bodies $21_{10}$ to $21_{15}$ from the imaging apparatus $1b$ in accordance with the processing in the flowchart in FIG. 7, similarly to the embodiment as described above. The image processing apparatus 100 generates a plurality of full-spherical images at different viewpoints corresponding to the respective imaging bodies $21_{10}$ to $21_{15}$, based on each of the captured images acquired from the imaging apparatus $1b$. The image processing apparatus 100 calculates disparities based on the plurality of full-spherical images, and generates a three-dimensional reconstruction model based on the calculated disparities.

With an increase in the distance between the imaging lenses, it becomes easier to calculate the disparities based on the captured images, so that it becomes possible to obtain a distance to an object at a far distance. In contrast, when the distance between the imaging lenses is short, it is possible to obtain a distance to an object at a near distance with high accuracy while preventing noise. Therefore, with use of the full-spherical image that is based on the captured images captured by the imaging apparatus $1b$ according to the first modification of the embodiment, it is possible to evenly calculate distances from the far distance to the near distance. Consequently, even when a large space is taken as a target, it is possible to generate a three-dimensional reconstruction model with high accuracy.

In the above described example, the image processing apparatus 100 generates a three-dimensional reconstruction model using all of the captured images that are captured by the imaging bodies $21_{10}$ to $21_{15}$ and obtained from the imaging apparatus $1b$; however, the present invention is not limited to this example. For example, the image processing apparatus 100 may generate a three-dimensional reconstruction model using captured images captured by the imaging bodies that are arbitrarily selected from among the imaging bodies $21_{10}$ to $21_{15}$.

For example, by selecting the imaging bodies $21_{10}$, $21_{11}$, and $21_{12}$, it is possible to generate a three-dimensional reconstruction model related to an object at a far distance at a higher speed. Similarly, by selecting the imaging bodies $21_{13}$, $21_{14}$, and $21_{15}$, it is possible to generate a three-dimensional reconstruction model related to an object at a near distance at a higher speed. In addition, it may be possible to select the imaging bodies $21_{10}$ and $21_{12}$ and the imaging bodies $21_{14}$ and $21_{15}$. In this case, accuracy may be degraded as compared to a case in which a three-dimensional reconstruction model is generated based on the captured images captured by all of the imaging bodies $21_{10}$ to $21_{15}$, but it is possible to generate a three-dimensional reconstruction model for objects at distances from the near distance to the far distance at a higher speed.

As a method of selecting imaging bodies for capturing images used to generate a three-dimensional reconstruction model from among the imaging bodies $21_1$ to $21_5$, it may be possible to provide a switch circuit that can be controlled by the control unit 220 for each of the imaging bodies $21_1$ to $21_5$, on each of signal paths (branch destinations of a trigger signal output from the control unit 220) for supplying the trigger signal to each of the driving units $210a_1$ to $210a_5$ and the driving units $210b_1$ to $210b_5$, for example.

In this case, the control unit 220 changes the states of the switch circuits for supplying trigger signals to the imaging bodies that are selected so as to use the captured images thereof from among the imaging bodies $21_1$ to $21_5$ to the closed states, and changes the states of the switch circuits for supplying trigger signals to the other imaging bodies to the opened states in accordance with an instruction issued via the data I/F 2006 or the communication I/F 2007.

For another example, it may be possible to select captured images by controlling reading that is performed by the memory controller 2002 from each of the buffer memories $211a_1$ to $211a_5$ and the buffer memories $211b_1$ to $211b_5$. In this case, the memory controller 2002 reads the captured images from the buffer memories included in the selected imaging bodies among the buffer memories $211a_1$ to $211a_5$ and the buffer memories $211b_1$ to $211b_5$ included in the imaging bodies $21_{10}$ to $21_{15}$, and stores the captured images in the RAM 2003 in accordance with an instruction that is issued from the control unit 220 in accordance with an instruction issued via the data I/F 2006 or the communication I/F 2007.

Furthermore, it may be possible to cause the image processing apparatus 100 to perform a process of selecting the imaging bodies whose captured images are to be used from among the imaging bodies $21_{10}$ to $21_{15}$. In this case, the imaging apparatus $1b$ normally performs imaging, and the image processing apparatus 100 selects a desired captured image from among captured images acquired from the imaging apparatus $1b$.

Second Modification of the Embodiment

Next, a second modification of the embodiment will be described. FIG. 19 schematically illustrates external appearance of an imaging apparatus according to the second modification of the embodiment. In FIG. 19, an imaging apparatus 1c includes a plurality of (in this example, three) imaging lenses $20a_{20}$, $20a_{21}$, and $20a_{22}$ and the shutter button 30 on a first surface (front surface) of a housing 10c that is formed in a substantially rectangular solid shape, similarly to the imaging apparatus 1a illustrated in FIG. 1. In the imaging apparatus 1c, imaging bodies $21_{20}$, $21_{21}$, and $21_{22}$, each including a combination of imaging lenses at the same height from the bottom surface among the imaging lenses $20a_{20}$, $20a_{21}$, and $20a_{22}$ and imaging lenses $20b_{20}$, $20b_{21}$, and $20b_{22}$ mounted on a second surface (back surface) of the housing 10c, are the same as those of the embodiment described above with reference to FIG. 1, and therefore, explanation thereof will be omitted. An imaging region 2c includes the three imaging bodies $21_{20}$, 2121, and $21_{22}$.

In the imaging apparatus 1c according to the second modification of the embodiment, intervals between the imaging bodies $21_{20}$, $21_{21}$, and $21_{22}$ are set to be a distance $d_6$ that is shorter than the distance d in the imaging apparatus 1a according to the embodiment described above. With this configuration, the imaging apparatus 1c is suitable for generating a three-dimensional reconstruction model related to an object at a near distance as compared to the imaging apparatus 1a according to the embodiment. In addition, in the example in FIG. 19, the imaging apparatus 1c includes the three imaging bodies $21_{20}$, $21_{21}$, and $21_{22}$, where the number of the imaging bodies is smaller than the imaging apparatus 1a illustrated in FIG. 1. Therefore, the imaging apparatus 1c according to the second modification of the embodiment can reduce costs as compared to the imaging apparatus 1a according to the embodiment.

Third Modification of the Embodiment

Next, a third modification of the embodiment will be described. FIG. 20 schematically illustrates external appearance of an imaging apparatus according to the third modification of the embodiment. In FIG. 20, an imaging apparatus 1d is configured by a combination of a plurality of housings 10d and 10e. The imaging apparatus 1d is the same as the imaging apparatus 1a according to the embodiment described above with reference to FIG. 1, except that a connector 11 for connecting internal circuits of the housing 10d to the outside is provided on a top surface of the housing 10d.

In FIG. 20, in the housing 10e, a plurality of (in this example, five) imaging lenses $20a_{30}$, $20a_{31}$, $20a_{32}$, $20a_{33}$, and $20a_{34}$ are mounted on a first surface (front surface) of the housing 10e that is formed in a substantially rectangular solid shape similarly to the imaging apparatus 1a illustrated in FIG. 1, but the shutter button 30 is not mounted. In the housing 10e, each of imaging lenses $20b_{30}$, $20b_{31}$, $20b_{32}$, $20b_{33}$, and $20b_{34}$ is mounted on a second surface (back surface) at the same height as each of the imaging lenses $20a_{30}$, $20a_{31}$, $20a_{32}$, $20a_{33}$, and $20a_{34}$ from the bottom surface, similarly to the imaging apparatus 1a.

In the housing 10e, imaging bodies $21_{30}$, $21_{31}$, $21_{32}$, $21_{33}$, and $21_{34}$, each including a combination of imaging lenses at the same height from the bottom surface among the imaging lenses $20a_{30}$ to $20a_{34}$ and the imaging lenses $20b_{30}$ to $20b_{34}$, are configured. The structure and the configuration of each of the imaging bodies $21_{30}$ to $21_{34}$ are the same as the structure and the configuration illustrated in FIG. 2, and therefore, explanation thereof will be omitted. Furthermore, each of the imaging bodies $21_{30}$ to $21_{34}$ includes an imaging element, a driving unit, and a buffer memory on each of the front surface and the back surface, similarly to the configuration described above with reference to FIG. 15. As illustrated, the housing 10e has an imaging region 2d including the imaging bodies $21_{30}$ to $21_{34}$, and has no operating region.

With reference to FIG. 15 and FIG. 16, the connector 11 includes at least each of terminals for connecting a connection line used by the control unit 220 (the trigger I/F 2004) to output a trigger signal to each of the imaging bodies $21_{30}$ to $21_{34}$, a plurality of connection lines for connecting the memory 221 (the memory controller 2002) and the buffer memories included in the imaging bodies $21_{30}$ to $21_{34}$, and a power line for supplying electrical power from the housing 10d to the housing 10e, for example.

The housing 10e includes, on a bottom surface, a connector including each of terminals corresponding to the connector 11. For example, the housing 10e includes the components illustrated in FIG. 15 except for the control unit 220, the memory 221, and the switch 222. The connector provided on the housing 10e includes each of the terminals for connecting a connection line for supplying a trigger signal as a single signal to each of the driving units included in the imaging bodies $21_{30}$ to $21_{34}$, a plurality of connection lines from the buffer memories included in the imaging bodies $21_{30}$ to $21_{34}$, and a power line for supplying electrical power to each of the units in the housing 10e.

By connecting the connector 11 provided on the top surface of the housing 10d to the connector provided on the bottom surface of the housing 10e, the housing 10d and the housing 10e are electrically connected to each other. It is preferable that the position of the housing 10e relative to the housing 10d is fixed by the connection between the connectors.

In a state where the housing 10d and the housing 10e are electrically connected to each other, when the shutter button 30 is operated in the housing 10d, the control unit 220 outputs a trigger signal. The trigger signal is supplied to each of the imaging bodies $21_1$ to $21_5$ included in the housing 10d, and also input to the housing 10e via the connector 11 and supplied to each of the imaging bodies $21_{30}$ to $21_{34}$ included in the housing 10e. With this configuration, it is possible to synchronize imaging performed by each of the imaging bodies $21_{30}$ to $21_{34}$ included in the housing 10e and imaging performed by each of the imaging bodies $21_1$ to $21_5$ included in the housing 10d in accordance with an operation on the shutter button 30 mounted on the housing 10d.

In the housing 10e, a captured image captured by each of the imaging bodies $21_{30}$ to $21_{34}$ is stored in the buffer memories included in each of the imaging bodies $21_{30}$ to $21_{34}$. Each of the captured images stored in each of the buffer memories is read from each of the buffer memories at a predetermined timing, input to the housing 10d via the connector 11, and supplied to the memory 221 in the housing 10d.

As described above, in the third modification of the embodiment, the plurality of housings 10d and 10e are combined and used as the single imaging apparatus 1d. Therefore, it is possible to enhance the imaging apparatus and generate a three-dimensional reconstruction model with higher accuracy, for example. Furthermore, according to the third modification of the embodiment, by preparing a plurality of configurations of the housing 10e to be connected to the housing 10d for example, it is possible to change the configuration of the imaging apparatus 1d as a combination of the housings 10d and 10e depending on usage.

Fourth Modification of the Embodiment

Next, a fourth modification of the embodiment will be described. The fourth modification of the embodiment is configured such that one of the imaging bodies $21_1$ to $21_5$ in the imaging apparatus $1a$ illustrated in FIG. 1 is used to output a finder image for checking an imaging range, for example. FIG. 21 illustrates an example of a configuration of an imaging apparatus according to the fourth modification of the embodiment.

In FIG. 21, the same components as the components illustrated in FIG. 15 described above are denoted by the same reference signs, and detailed explanation thereof will be omitted. External appearance of an imaging apparatus $1e$ according to the fourth modification of the embodiment is the same as the imaging apparatus $1a$ illustrated in FIG. 1, and therefore, explanation thereof will be omitted.

In FIG. 21, the imaging apparatus $1e$ is configured by adding an image processing unit 230 in the imaging body $21_1$ among the imaging bodies $21_1$ to $21_5$ of the imaging apparatus $1a$ illustrated in FIG. 15. A configuration in which the image processing unit 230 is added in the imaging body $21_1$ (or any of the imaging bodies $21_1$ to $21_5$) is referred to as an imaging body 22. It may be possible to add the image processing unit 230 in the control unit 220.

The other imaging bodies $21_2$ to $21_5$ of the imaging apparatus $1a$ can be applied as they are in the imaging apparatus $1e$. In the imaging apparatus $1e$, the control unit 220 outputs a frame signal that is a signal in a frame cycle (for example, 60 Hz), in addition to the trigger signal that is output according to an operation on the shutter button 30. The frame signal is supplied to each of driving units $210a_1$ and $210b_1$ included in the imaging body 22 and the image processing unit 230.

In the imaging body 22, the driving unit $210a_1$ reads a charge from the imaging element $200a_1$ in the frame cycle in accordance with the frame signal supplied from the control unit 220, and outputs a captured image based on the read charge. The imaging signal output from the driving unit $210a_1$ in the frame cycle is supplied to the image processing unit 230.

In the imaging body 22, the driving unit $210b_1$ similarly reads a charge from the imaging element $200b_1$ in the frame cycle in accordance with the frame signal supplied from the control unit 220, and outputs a captured image based on the read charge. The captured image output from the driving unit $210b_1$ in the frame cycle is supplied to the image processing unit 230.

The image processing unit 230 includes two buffer memories that correspond to the respective driving units $210a_1$ and $210b_1$ and that can store captured images of a single frame, a video memory that can store at least a finder image of a single frame, and a synthesizing unit that synthesizes the two captured images to generate a full-spherical image, for example. Each of the captured images supplied from the driving units $210a_1$ and $210b_1$ in the frame cycle are stored in the two respective buffer memories. When the captured images of a single frame are respectively stored in the two buffer memories, the synthesizing unit reads the captured images from the two buffer memories, and synthesizes the captured images to generate a single full-spherical image. The generated full-spherical image is stored in the video memory.

The image processing unit 230 reads the full-spherical image from the video memory in the frame cycle in accordance with the frame signal, and outputs the full-spherical image as a finder image. The finder image output from the image processing unit 230 is output to the outside from the data I/F 2006 (see FIG. 16), for example. By connecting a display apparatus including a display device to the data I/F 2006, it is possible to display the finder image on the display device of the display apparatus; however, it is not limited thereto. The finder image output from the image processing unit 230 may be output to the outside via the communication I/F 2007.

In addition, in the imaging body 22, each of the driving units $210a_1$ and $210b_1$ reads a charge from each of the imaging elements $200a_1$ and $200b_1$ and outputs the charge as a captured image in accordance with a trigger signal that is output from the control unit 220 in accordance with an operation on the shutter button 30, similarly to the other driving units $210a_2, \ldots, 210a_5$ and the driving units $210b_2, \ldots, 210b_5$.

As described above, according to the fourth modification of the embodiment, one of the imaging bodies included in the imaging apparatus $1e$ is used as the imaging body 22 for outputting the finder image. Therefore, with use of the imaging apparatus $1e$, it is possible to perform imaging while checking the imaging range, so that it is possible to reduce time taken for the imaging. Furthermore, it is not necessary to separately provide an imaging body for acquiring the finder image, so that it is possible to reduce costs. It is preferable that the imaging body for outputting the finder image is arranged at the endmost position on the housing of the imaging apparatus $1e$ among the plurality of imaging bodies included in the imaging apparatus $1e$, like the imaging body $21_1$ in FIG. 1, for example. This is because the imaging body arranged at such a position can image an external region on a vertex portion of the full-spherical image, and a larger external region can be displayed on the finder image as compared to the imaging bodies arranged at the other positions.

Fifth Modification of the Embodiment

Next, a fifth modification of the embodiment will be described. FIG. 22 schematically illustrates external appearance of an imaging apparatus $1f$ according to the fifth modification of the embodiment in comparison with the external appearance of the imaging apparatus $1a$ according to the embodiment described above. In FIG. 22, the same components as the components illustrated in FIG. 1 described above are denoted by the same reference signs, and detailed explanation thereof will be omitted. In the imaging apparatus $1f$, the arrangement of the imaging bodies $21_1$ to $21_5$ and the circuit configuration are the same as those of the imaging apparatus $1a$ described above, and therefore, explanation thereof will be omitted.

The housing $10a$ of the imaging apparatus $1a$ according to the embodiment is configured such that a length $L_2$ of the operating region $3a$ is shorter than a length $L_1$ of the imaging region $2a$, as illustrated on the right side of FIG. 22. The length described here is the length in the long side direction of the housing $10a$. In the fifth modification of the embodiment, the housing $10f$ of the imaging apparatus $1f$ is configured such that a length $L_3$ of the operating region $3b$ including the shutter button 30 and a gripping unit 31' is longer than the length $L_1$ of the imaging region $2a$.

As described above, by configuring the housing $10f$ such that the length $L_3$ of the operating region $3b$ is set longer, the imaging apparatus $1f$ captures images at a higher position more easily than the imaging apparatus $1a$ does. In addition, by configuring the length $L_3$ of the operating region $3f$ to be longer, it is possible to secure a larger space for storing the circuit unit 2030 and the battery 2020 (refer to FIG. 17). This configuration can increase a degree of freedom in design and increase the size of the battery 2020.

When the length $L_1$ of the imaging region 2a is set longer, it is possible to increase each distance d (baseline length B) between the imaging bodies $21_1$ to $21_5$ to a larger value, and distance information on an object at a farther distance can be acquired.

FIG. 22 illustrates the imaging apparatus 1a that includes the operating region 3a with the length $L_2$ shorter than the length $L_1$ of the imaging region 2a, and the imaging apparatus 1f that includes the operating region 3b with the length $L_3$ longer than the length $L_1$ of the imaging region 2a; however, the present invention is not limited to these examples. That is, in the imaging apparatus 1a, the length $L_1$ of the imaging region 2a and the length $L_2$ of the operating region 3a may be substantially the same, for example.

Sixth Modification of the Embodiment

Next, a sixth modification of the embodiment will be described. FIG. 23 schematically illustrates external appearance of an imaging apparatus according to the sixth modification of the embodiment. In FIG. 23, the same components as the components illustrated in FIG. 1 described above are denoted by the same reference signs, and detailed explanation thereof will be omitted. In the imaging apparatus 1g, the arrangement of the imaging bodies $21_1$ to $21_5$ and the circuit configuration are the same as those of the imaging apparatus 1a described above, and therefore, explanation thereof will be omitted.

In FIG. 23, similarly to the imaging apparatus 1a illustrated in FIG. 1, the housing 10g of the imaging apparatus 1g includes an operating region 3c including a shutter button 30a and a gripping unit 31a on the lower end side of the imaging region 2a. The imaging apparatus 1g further includes an operating region 3d including a shutter button 30b and a gripping unit 31b on the upper end side of the imaging region 2a. The gripping units 31a and 31b are made hard to slip in the same manner as the gripping unit 31 described with reference to FIG. 1.

In the imaging apparatus 1g, it is possible to cause the imaging bodies $21_1$ to $21_5$ to perform imaging in a synchronous manner by operating either the shutter button 30a or the shutter button 30b. FIG. 24 illustrates an example of a circuit configuration of the imaging apparatus according to the sixth modification of the embodiment. The circuit configuration of the imaging apparatus 1g is schematically illustrated. In FIG. 24, the same components as the components illustrated in FIG. 17 described above are denoted by the same reference signs, and detailed explanation thereof will be omitted.

As illustrated in FIG. 24, outputs from the shutter buttons 30a and 30b are supplied to the same circuit unit 2030. This state corresponds to a state in which two switches 222 corresponding to the respective shutter buttons 30a and 30b are arranged in parallel and connected to the control unit 220, in the configuration illustrated in FIG. 20 described above. The control unit 220 supplies a trigger signal to each of the imaging bodies $21_1$ to $21_5$ simultaneously when either the shutter button 30a or the shutter button 30b is operated. In response to the trigger signal, the imaging bodies $21_1$ to $21_5$ perform imaging in a synchronous manner.

As described above, by configuring the housing 10g of the imaging apparatus 1g such that the operating regions 3c and 3d including the shutter buttons 30a and 30b respectively are arranged on the respective end sides of the housing 10g, a user can perform imaging while holding either end side of the housing 10g of the imaging apparatus 1g in the long side direction, that is, either the operating region 3c or the operating region 3d.

As illustrated in FIG. 24, the imaging apparatus 1g may further include a direction sensor 2040. The direction sensor 2040 is a sensor for detecting at least the upside and the downside in the direction along the long side of the imaging apparatus 1g. The direction sensor 2040 may be configured using an acceleration sensor.

An output of the direction sensor 2040 is supplied to the circuit unit 2030 as direction information indicating which of the operating regions 3c and 3d is located upward (or downward) while the imaging apparatus 1g is held. The direction information is then passed to the control unit 220. The control unit 220 adds the direction information supplied from the direction sensor 2040 to captured images captured by the imaging bodies $21_1$ to $21_5$, and stores, in the memory 221, the captured images with the direction information.

In this manner, a user can easily understand the up and down directions and positional relations of the captured images when processing the captured images stored in the memory 221 by the image processing apparatus 100.

As the direction sensor 2040, a 9-axis sensor in which a 3-axis acceleration sensor, a 3-axis gyro sensor, and a 3-axis magnetic field sensor are integrated may be used. In this case, in addition to the up and down directions of the imaging apparatus 1g, an angle of the imaging apparatus 1g with respect to the vertical direction, and an orientation of the imaging apparatus 1g on a horizontal plane can be obtained. With this configuration, a user can generate a three-dimensional reconstruction model with high accuracy on the basis of captured images stored in the memory 221.

Seventh Modification of the Embodiment

Next, a seventh modification of the embodiment will be described. The seventh modification of the embodiment is an example configuration in which the housing 10g of the imaging apparatus 1g according to the sixth modification of the embodiment described above is divided into two parts. FIG. 25 and FIG. 26 schematically illustrate external appearance of an imaging apparatus 1h according to the seventh modification of the embodiment. As illustrated in FIG. 25, part (a) of FIG. 26, and part (b) of FIG. 26, the imaging apparatus 1h is configured with two housings, that is, a housing $10h_1$ and a housing $10h_2$, that are combined to each other.

In FIG. 25, the housing $10h_1$ includes an imaging region 2e including imaging bodies $21_{42}$, $21_{43}$, and $21_{44}$, and an operating region 3e including a shutter button 30a' and a gripping unit 31a'. Similarly, the housing $10h_2$ includes an imaging region 2f including imaging bodies $21_{40}$ and $21_{41}$, and an operating region 3f including a shutter button 30b' and a gripping unit 31b'.

The gripping units 31a' and 31b' included in the operating regions 3e and 3f, respectively, are made hard to slip in the same manner as the gripping unit 31 described with reference to FIG. 1.

Of the housing $10h_1$, a surface that is in contact with the lower edges, in the drawings, on the side on which the shutter button 30a' is arranged serves as a bottom surface; and a surface that is in contact with the upper edges, in the drawings, on the side on which the imaging body $21_{42}$ is arranged serves as a top surface. Similarly, of the housing $10h_2$, a surface that is in contact with the upper edges, in the drawings, on the side on which the shutter button 30b' is arranged serves as a bottom surface; and a surface that is in contact with the lower edges, in the drawings, on the side on which the imaging body $21_{41}$ is arranged serves as a top surface.

In the housing $10h_1$, the imaging body $21_{42}$ includes a pair of imaging lenses $20a_{42}$ and $20b_{42}$, the imaging body $21_{43}$ includes a pair of imaging lenses $20a_{43}$ and $20b_{43}$, and the imaging body $21_{44}$ includes a pair of imaging lenses $20a_{44}$ and $20b_{44}$. The imaging lenses $20a_{42}$ to $20a_{44}$ are mounted on a first surface (front surface) of the housing $10h_1$ and the imaging lenses $20b_{42}$ to $20b_{44}$ are mounted on a second surface (back surface) of the housing $10h_1$. In the housing $10h_2$, the imaging body $21_{40}$ includes a pair of imaging lenses $20a_{40}$ and $20b_{40}$, and the imaging body $21_{41}$ includes a pair of imaging lenses $20a_{41}$ and $20b_{41}$. The imaging lenses $20a_{40}$ and $20a_{41}$ are mounted on the first surface, and the imaging lenses $20b_{40}$ and $20b_{41}$ are mounted on the second surface.

The imaging bodies $21_{40}$ and $21_{41}$ are arranged in the housing $10h_2$ and the imaging bodies $21_{42}$ to $21_{44}$ are arranged in the housing $10h_1$ in such a manner that the distance between adjacent imaging bodies is set to the distance d when the top surfaces of the housing $10h_1$ and the housing $10h_2$ are joined together.

Part (a) of FIG. 26 and part (b) of FIG. 26 indicate a state in which the housings $10h_1$ and $10h_2$ are separated from each other. The top surfaces of the housings $10h_1$ and $10h_2$ include connectors $32a$ and $32b$, respectively, for electrically connecting the housing $10h_1$ with the housing $10h_2$. The connectors $32a$ and $32b$ also have a function to fix the housings $10h_1$ and $10h_2$ when connected so that the housings $10h_1$ and $10h_2$ can maintain a certain positional relation to each other.

In the imaging apparatus $1h$, it is possible to cause the imaging bodies $21_{40}$ to $21_{44}$ to perform imaging in a synchronous manner by operating either the shutter button $30a'$ or the shutter button $30b'$. Furthermore, the imaging apparatus $1h$ can output captured images captured by the imaging bodies $21_{40}$ to $21_{44}$ from either the housing $10h_1$ or the housing $10h_2$. Part (a) of FIG. 27 illustrates an example of a circuit configuration of the housing $10h_1$ according to the seventh modification of the embodiment. Part (b) of FIG. 27 illustrates an example of a circuit configuration of the housing $10h_2$ according to the seventh modification of the embodiment.

As illustrated in part (a) of FIG. 27, the housing $10h_1$ includes the battery 2020, the circuit unit 2030, and the direction sensor 2040. As illustrated in part (b) of FIG. 27, the housing $10h_2$ includes a battery 2020', a circuit unit 2030', and a direction sensor 2040' equivalent to the battery 2020, the circuit unit 2030, and the direction sensor 2040, respectively, included in the housing $10h_1$. An output of the shutter button $30a'$ is supplied to the circuit unit 2030, and passed to the control unit 220 in the circuit unit 2030. Similarly, an output of the shutter button $30b'$ is supplied to the circuit unit 2030', and passed to the control unit 220 in the circuit unit 2030'.

In addition, the housings $10h_1$ and $10h_2$ can transmit and/or receive, via the connectors $32a$ and $32b$, a trigger signal for controlling imaging performed by the imaging bodies $21_{40}$ to $21_{44}$, and captured images captured by the imaging bodies $21_{40}$ to $21_{44}$.

For example, when the shutter button $30a'$ is operated while the housings $10h_1$ and $10h_2$ are connected with each other via the connectors $32a$ and $32b$, a trigger signal is output from the control unit 220 in the circuit unit 2030 in the housing $10h_1$ in response to the operation on the shutter button $30a'$. The trigger signal is supplied to each of the imaging bodies $21_{42}$ to $21_{44}$ in the housing $10h_1$, and also supplied to each of the imaging bodies $21_{40}$ and $21_{41}$ in the housing $10h_2$ via the connectors $32a$ and $32b$. In response to the trigger signal, the imaging bodies $21_{40}$ to $21_{44}$ included in the imaging apparatus $1h$ perform imaging in a synchronous manner.

In the housing $10h_1$, the captured images captured by the imaging bodies $21_{42}$ to $21_{44}$ upon receiving the trigger signal supplied in response to the operation on the shutter button $30a'$ are supplied to the circuit unit 2030. The control unit 220 in the circuit unit 2030 adds direction information, which is supplied from the direction sensor 2040 included in the housing $10h_1$, to the captured images captured by the imaging bodies $21_{42}$ to $21_{44}$, and stores the captured images with the direction information in the memory 221 in the circuit unit 2030.

In the housing $10h_2$, the captured images captured by the imaging bodies $21_{40}$ and $21_{41}$ upon receiving the trigger signal are supplied to the circuit unit 2030 in the housing $10h_1$ via the connectors $32b$ and $32a$. The control unit 220 in the circuit unit 2030 adds direction information, which is supplied from the direction sensor 2040 included in the housing $10h_1$, to the captured images captured by the imaging bodies $21_{40}$ and $21_{41}$, and stores the captured images with the direction information in the memory 221 in the circuit unit 2030.

A user causes, for example, the image processing apparatus 100 to read the captured images stored in the memory 221, that is, the captured images captured by the imaging bodies $21_{42}$ to $21_{44}$ in the housing $10h_1$ and the captured images captured by the imaging bodies $21_{40}$ and $21_{41}$ in the housing $10h_2$. With this configuration, it is possible to generate a three-dimensional reconstruction model on the basis of the captured images captured by the three imaging bodies $21_{42}$ to $21_{44}$ included in the housing $10h_1$ and the captured images captured by the two imaging bodies $21_{40}$ and $21_{41}$ included in the housing $10h_2$, the captured images being obtained in a synchronous manner.

The same processing described above is performed when the shutter button $30b'$ mounted on the housing $10h_2$ is operated. That is, a trigger signal is output from the control unit 220 in the circuit unit 2030' in the housing $10h_2$ in response to an operation on the shutter button $30b'$. The trigger signal is supplied to each of the imaging bodies $21_{40}$ and $21_{41}$ in the housing $10h_2$, and also supplied to each of the imaging bodies $21_{42}$ to $21_{44}$ in the housing $10h_1$ via the connectors $32b$ and $32a$, causing the imaging bodies $21_{40}$ to $21_{44}$ to perform imaging in a synchronous manner.

The captured images captured by the imaging bodies $21_{40}$ and $21_{41}$ are supplied to the circuit unit 2030', added with direction information supplied from the direction sensor 2040' by the control unit 220 in the circuit unit 2030', and then stored in the memory 221 in the circuit unit 2030'. In the housing $10h_1$, the captured images captured by the imaging bodies $21_{42}$ to $21_{44}$ in synchronization with the imaging bodies $21_{40}$ and $21_{41}$ are supplied to the circuit unit 2030' in the housing $10h_2$ via the connectors $32a$ and $32b$. The captured images are added with direction information, which is supplied from the direction sensor 2040', by the control unit 220 in the circuit unit 2030', and then stored in the memory 221 in the circuit unit 2030'.

With this configuration, it is possible to obtain the captured images captured in a synchronous manner by the five imaging bodies $21_{40}$ to $21_{44}$ separately included in the housings $10h_1$ and $10h_2$ with an operation on the shutter button $30b'$ mounted on the housing $10h_2$ as well.

The imaging apparatus $1h$ according to the seventh modification of the embodiment has a configuration in which the housing $10h_1$ including the three imaging bodies $21_{42}$ to $21_{44}$ and the housing $10h_2$ including the two imaging bodies $21_{40}$ and $21_{41}$ are separated from each other as described above. Thus, in the housing $10h_1$ for example, it is possible to make wires connecting the imaging bodies $21_{42}$ to $21_{44}$ with the circuit unit 2030 shorter than, for example, the wires of the five imaging bodies $21_1$ to $21_5$ included in the same housing 10a as illustrated in FIG. 1. With this configuration, it is possible to increase a degree of freedom in designing substrate arrangement and increase the size of a battery.

In the above description, the captured images captured by the imaging bodies $21_{40}$ to $21_{44}$ are stored in the memory 221 included in the housing $10h_1$ when the shutter button 30a' is operated, and stored in the memory 221 included in the housing $10h_2$ when the shutter button 30b' is operated; however, the present invention is not limited to this example. For example, the captured images captured in response to an operation on the shutter button 30a' may be stored in the memory 221 included in the housing $10h_1$, and the captured images captured in response to an operation on the shutter button 30b' may be stored in the memory 221 included in the housing $10h_2$. Alternatively, the captured images captured in response to an operation on the shutter button 30a' may be stored in the memory 221 included in the housing $10h_2$, and the captured images captured in response to an operation on the shutter button 30b' may be stored in the memory 221 included in the housing $10h_1$.

Eighth Modification of the Embodiment

Next, an eighth modification of the embodiment will be described. In the above embodiment, description has been made in which, in the imaging apparatus 1a, the shutter button 30 is arranged on the center line C on which the imaging lenses $20a_1$ to $20a_5$ are aligned, as illustrated in FIG. 1 and part (b) of FIG. 3. Alternatively, in the eighth modification of the embodiment, the shutter button 30 is arranged at a position away from the center line C by a certain distance or farther.

FIG. 28 schematically illustrates external appearance of an imaging apparatus according to the eighth modification of the embodiment. FIG. 28 illustrates that, on the housing 10i of the imaging apparatus 1i, the operating region 3g including the shutter button 30 and the gripping unit 31a is arranged substantially at 90 degrees with respect to the imaging region 2a including the imaging bodies $21_1$ to $21_5$. The shutter button 30 is arranged at a position away from the center line C, on which the imaging bodies $21_1$ to $21_5$ (the imaging lenses $20a_1$ to $20a_5$) are aligned, by a certain distance or farther. It is preferable that the shutter button 30 is positioned such that an edge of the shutter button 30 does not overlap an extended line of the center line C in the imaging region 2a of the housing 10i, for example. That is, as illustrated in FIG. 28, in the imaging apparatus 1i according to an eighth embodiment, the shutter button 30 is not arranged on the extended line of the imaging bodies $21_1$ to $21_5$, and the shutter button 30 is arranged at a position away from the extended line by a certain distance or farther.

In the imaging apparatus 1i, the arrangement of the imaging bodies $21_1$ to $21_5$ and the circuit configuration are the same as those of the imaging apparatus 1a described above, and therefore, explanation thereof will be omitted.

As described above, by positioning the shutter button 30 at a position away from the center line C by a certain distance or farther, it is possible to prevent a finger, a hand, or other devices of a user operating the shutter button 30 from being included in the captured images captured by the imaging bodies $21_1$ to $21_5$.

FIG. 28 illustrates that the operating region 3g and the imaging region 2a form an angle of substantially 90 degrees therebetween; however, the angular relation between the operating region 3g and imaging region 2a is not limited to substantially 90 degrees. That is, the shutter button 30 may simply be arranged at a position away from the center line C, on which the imaging bodies $21_1$ to $21_5$ are aligned, by a certain distance or farther.

Ninth Modification of the Embodiment

Next, a ninth modification of the embodiment will be described. In the embodiment described above, the shutter button 30 for instructing the imaging bodies $21_1$ to $21_5$ to perform imaging are arranged on the housing 10a of the imaging apparatus 1a. The same configuration is used in the above-described modifications of the embodiment. Alternatively, the ninth modification of the embodiment allows an instruction for the imaging bodies $21_1$ to $21_5$ to perform imaging to be given from the outside of the housing 10a of the imaging apparatus 1a.

FIG. 29 illustrates external appearance of an imaging apparatus according to the ninth modification of the embodiment, and FIG. 30 illustrates an example of a configuration of a control unit 220' and the memory 221 of the same imaging apparatus. In FIG. 29 and FIG. 30, components common to the components illustrated in FIG. 1 and FIG. 16 described above are denoted by the same reference signs, and detailed explanation thereof will be omitted.

As illustrated in FIG. 30, an imaging apparatus 1j according to the ninth modification of the embodiment includes a wireless communication I/F 2009 for performing wireless communication with the control unit 220'. Electrical power from the above-described battery 2020 is also supplied to the wireless communication I/F 2009. The imaging apparatus 1j receives, through the wireless communication I/F 2009, a signal 34 for giving an instruction to perform imaging. The signal 34 is transmitted from the wireless transmitter 33 in response to an operation on the shutter button 30' mounted on the wireless transmitter 33. In the imaging apparatus 1j, the control unit 220' instructs the imaging bodies $21_1$ to $21_5$ to perform imaging in response to the received signal 34. In the example illustrated in FIG. 29, the gripping unit 30c included in the housing 10j of the imaging apparatus 1j does not have a shutter button.

A method of communication performed between the wireless transmitter 33 and the wireless communication I/F 2009 is not specifically limited. Example methods of communication performed between the wireless transmitter 33 and the wireless communication I/F 2009 may possibly include Bluetooth (registered trademark) and a wireless LAN. It is possible to use a communication method specific to the imaging apparatus 1j for this communication. In addition, this communication is not limited to communication using radio waves, and may be performed using other media such as light and sound. Furthermore, this communication is not limited to wireless, and may be wired.

Aspect 1

The imaging apparatus according to any one of the embodiment and the modifications described above includes a first full-spherical imaging unit and a second full-spherical imaging unit. The first full-spherical imaging unit and the second full-spherical imaging unit are provided integrally to a same housing.

Aspect 2

The imaging apparatus includes at least two full-spherical imaging units and a holding unit that are provided integrally to a same housing.

Aspect 3

The imaging apparatus includes at least two full-spherical imaging units and a control unit including a circuit board that are provided integrally to a same housing.

Aspect 4

The imaging apparatus includes at least two full-spherical imaging units and a power supply unit that supplies electrical power to the at least two full-spherical imaging units. The power supply unit and the at least two full-spherical imaging units are provided integrally to a same housing.

Aspect 5

The imaging apparatus includes at least two full-spherical imaging units and a shutter button that are provided integrally to a same housing.

Aspect 6

A method of controlling an imaging apparatus including a plurality of imaging bodies is provided. Each of the imaging bodies includes: a first optical element capable of imaging a range including a hemisphere that is centered at an optical axis and oriented in a first direction of the optical axis; and a second optical element capable of imaging a range including a hemisphere that is centered at the optical axis and oriented in a second direction opposite to the first direction. The imaging bodies are arrayed in a direction perpendicular to the optical axis. The method includes: causing the plurality of imaging bodies to perform imaging in a synchronous manner, and acquiring a captured image from each of the imaging bodies.

Aspect 7

An imaging apparatus includes two or more imaging bodies. Each of the imaging bodies includes a first optical element and a second optical element. The first optical element is capable of imaging a range including a hemisphere that is centered at an optical axis and oriented in a first direction of the optical axis. The second optical element is capable of imaging a range including a hemisphere that is centered at the optical axis and oriented in a second direction opposite to the first direction.

While the embodiments are described above as preferred embodiments of the present invention, the present invention is not thus limited. Various modifications may be made without departing from the gist of the invention.

REFERENCE SIGNS LIST 1a, 1b, 1c, 1d, 1e, 1f, 1g, 1h, 1i, 1j Imaging apparatus
2a, 2b, 2c, 2d, 2e, 2f Imaging region
3a, 3a', 3b, 3c, 3d, 3e, 3f, 3g Operating region
10a, 10b, 10c, 10d, 10e, 10f, 10g, $10h_1$, $10h_2$, 10i, 10j Housing
11, 32a, 32b Connector
21, $21_1$, $21_2$, $21_3$, $21_4$, $21_5$, $21_{10}$, $21_{11}$, $21_{12}$, $21_{13}$, $21_{14}$, $21_{15}$, $21_{20}$, $21_{21}$, $21_{22}$, $21_{30}$, $21_{31}$, $21_{32}$, $21_{33}$, $21_{34}$, $21_{40}$, $21_{41}$, $21_{42}$, $21_{43}$, $21_{44}$ Imaging body
30, 30', 30a, 30a', 30b, 30b' Shutter button
31, 31a, 31a', 31b, 31b', 31c Gripping unit
100 Image processing apparatus
200a, 200b, $200a_1$, $200a_2$, $200a_5$, $200b_1$, $200b_2$, $200b_5$ Imaging element
$210a_1$, $210a_2$, $210a_5$, $210b_1$, $210b_2$, $210b_5$ Driving unit
$211a_1$, $211a_2$, $211a_5$, $211b_1$, $211b_2$, $211b_5$ Buffer memory
220 Control unit
221 Memory
222 Switch
230 Image processing unit
$300_1$, $300_2$, $300_3$, $300_4$, $300_5$ Full-spherical image
2000 CPU
2002 Memory controller
2003 RAM
2004 Trigger I/F
2005 Switch circuit
2006 Data OF
2007 Communication I/F
2020, 2020' Battery
2030, 2030' Circuit unit
2040, 2040' Direction sensor

CITATION LIST

Patent Literature

[PTL 1] Japanese Patent No. 5011528
[PTL 2] Japanese Unexamined Patent Application Publication No. 2013-218278
[PTL 3] Japanese Patent No. 5783314
[PTL 4] Japanese Patent No. 5839135

The invention claimed is:

1. An imaging apparatus, comprising:
a plurality of imaging bodies, each of the imaging bodies including:
a first optical element configured to image a first range including a hemisphere that is centered at an optical axis and oriented in a first direction of the optical axis; and
a second optical element configured to image a second range including a hemisphere that is centered at the optical axis and oriented in a second direction opposite to the first direction, and
the imaging bodies being arranged in a single common housing and being arrayed in a line in a direction perpendicular to the optical axis; and
imaging control circuitry configured to cause the plurality of imaging bodies to perform imaging in a synchronous manner, and acquire a captured image from each of the imaging bodies,
wherein the imaging control circuitry is further configured to arbitrarily select, from among the imaging bodies, a plurality of imaging bodies, and generate a three-dimensional reconstruction model using only those captured images captured by the selected plurality of imaging bodies during the imaging.

2. The imaging apparatus according to claim 1, wherein at least one of the imaging bodies is arranged such that an interval from an adjacent imaging body on one side and an interval from an adjacent imaging body on the other side are different.

3. The imaging apparatus according to claim 1, further comprising a power supply that supplies electrical power to at least the plurality of imaging bodies, the power supply being arranged on an extended line of a line on which the plurality of imaging bodies are aligned.

4. The imaging apparatus according to claim 1, wherein the imaging control circuitry is further configured to cause one of the imaging bodies to perform imaging in a predetermined cycle, and output each of the captured images captured in the predetermined cycle.

5. The imaging apparatus according to claim 1, wherein each of the imaging bodies includes:
a lens on which light is incident such that a direction of the optical axis serves as a center;

a light-receiving element that receives light incident from a direction of a line on which the plurality of imaging bodies are aligned; and an optical path converter that causes the light-receiving element to receive light emitted from the lens.

6. The imaging apparatus according to claim 1, wherein the imaging control circuitry is further configured to cause the plurality of imaging bodies and a plurality of imaging bodies included in another imaging apparatus to perform imaging in a synchronous manner, the other imaging apparatus being arranged in the direction of the line on which the plurality of imaging bodies are arrayed.

7. The imaging apparatus according to claim 6, further comprising a connector provided at an end of the line on which the plurality of imaging bodies are aligned, the end being opposite to an end at which an operating region is provided, the operating region including a shutter button configured to receive an operation by a user instruct the imaging control circuitry to cause the plurality of imaging bodies to perform imaging, the connector being configured to perform communication with the other imaging apparatus and to fix a positional relation with the other imaging apparatus.

8. The imaging apparatus according to claim 1, wherein a length of an operating region is longer than a length of an imaging region including the plurality of imaging bodies, the operating region including a shutter button configured to receive an operation by a user to instruct the imaging control circuitry to cause the plurality of imaging bodies to perform imaging.

9. The imaging apparatus according to claim 1, wherein a length of an operating region is shorter than a length of an imaging region including the plurality of imaging bodies, the operating region including a shutter button configured to receiving an operation by a user to instruct the imaging control circuitry to cause the plurality of imaging bodies to perform imaging.

10. The imaging apparatus according to claim 1, wherein a shutter button is arranged away, by at least a predetermined distance, from an extended line of the line on which the plurality of imaging bodies are aligned, the shutter button being configured to receive an operation by a user to instruct the imaging control circuitry to cause the plurality of imaging bodies to perform imaging.

11. The imaging apparatus according to claim 1, wherein each of the imaging bodies includes an optical lens with an angle of view of 180 degrees or more.

12. The imaging apparatus according to claim 1, wherein the image control circuitry is further configured to generate a full-spherical image as a finder image using image data captured by a certain imaging body arranged at an endmost position, among the plurality of imaging bodies, and output the finder image.

13. An imaging apparatus, comprising:
a plurality of imaging bodies, each of the imaging bodies including
a first optical element configured to image a first range including a hemisphere that is centered at an optical axis and oriented in a first direction of the optical axis; and
a second optical element configured to image a second range including a hemisphere that is centered at the optical axis and oriented in a second direction opposite to the first direction, and
the imaging bodies being arranged in a single common housing and being arrayed in a line in a direction perpendicular to the optical axis; and
imaging control circuitry configured to cause the plurality of imaging bodies to perform imaging in a synchronous manner, and acquire a captured image from each of the imaging bodies,
wherein the plurality of imaging bodies are arrayed on the line, and
wherein an operating region is provided to both ends of the line on which the plurality of imaging bodies are aliened, the operating region including a shutter button configured to receive an operation by a user to instruct the imagine control circuitry to cause the plurality of imaging bodies to perform imaging.

14. An imaging apparatus, comprising:
a plurality of imaging bodies, each of the imaging bodies including
a first optical element configured to image a first range including a hemisphere that is centered at an optical axis and oriented in a first direction of the optical axis; and
a second optical element configured to image a second range including a hemisphere that is centered at the optical axis and oriented in a second direction opposite to the first direction, and
the imaging bodies being arranged in a single common housing and being arrayed in a line in a direction perpendicular to the optical axis; and
imaging control circuitry configured to cause the plurality of imaging bodies to perform imaging in a synchronous manner, and acquire a captured image from each of the imaging bodies,
wherein the imagine control circuitry is further configured to cause the plurality of imaging bodies included in the housing and a plurality of imaging bodies included in a second housing to perform imaging in a synchronous manner, the second housing being physically connected to the housing and arranged in the direction of the line on which the plurality of imaging bodies are arrayed, and the second housing being different from the housing including the plurality of imaging bodies.

15. The imaging apparatus according to claim 14, further comprising circuitry configured to generate a plurality of full-spherical images at different viewpoints corresponding to locations of the at least three imaging bodies, calculate disparities based on the generated plurality of full-spherical images, and generate a three-dimensional reconstruction model based on the calculated disparities.

* * * * *